(12) United States Patent
Nose et al.

(10) Patent No.: US 11,772,614 B2
(45) Date of Patent: Oct. 3, 2023

(54) DRIVE ASSISTANCE DEVICE FOR SADDLE TYPE VEHICLE

(71) Applicant: HONDA MOTOR CO., LTD., Tokyo (JP)

(72) Inventors: Tsubasa Nose, Wako (JP); Tsutomu Tamashima, Wako (JP); Kiyotaka Sakai, Wako (JP); Hiroaki Uchisasai, Wako (JP); Yuta Kanbe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 154 days.

(21) Appl. No.: 17/437,057

(22) PCT Filed: Mar. 29, 2019

(86) PCT No.: PCT/JP2019/014034
§ 371 (c)(1),
(2) Date: Sep. 8, 2021

(87) PCT Pub. No.: WO2020/202262
PCT Pub. Date: Oct. 8, 2020

(65) Prior Publication Data
US 2022/0161766 A1 May 26, 2022

(51) Int. Cl.
*B60T 7/12* (2006.01)
*B60T 8/17* (2006.01)
(Continued)

(52) U.S. Cl.
CPC .............. *B60T 7/12* (2013.01); *B60T 8/1706* (2013.01); *B60T 8/17551* (2013.01); *B62L 3/00* (2013.01);
(Continued)

(58) Field of Classification Search
CPC ...... B60T 7/12; B60T 8/1706; B60T 8/17551; B60T 2220/02; B60T 2230/02; B60T 2230/03; B62L 3/00
(Continued)

(56) References Cited

U.S. PATENT DOCUMENTS 7,601,097 B2 * 10/2009 Miyamaru ......... A63B 22/0605
434/61
8,474,857 B2 * 7/2013 Kobayashi ............. B62K 19/30
280/728.2
(Continued)

FOREIGN PATENT DOCUMENTS

DE 102015215527 A1 * 2/2017 .............. B62J 33/00
DE 202017107397 U1 * 1/2018 ............ B60W 30/08
(Continued)

OTHER PUBLICATIONS

Mammar, et al., Motorcycle roll motion stabilization and observer design; Jul. 14, 2009; 2009 17th Mediterranean Conference on Control and Automation; pp. 1523-1526; https://ieeexplore.ieee.org/document/5164763 (Year: 2009).*
(Continued)

*Primary Examiner* — Atul Trivedi
(74) *Attorney, Agent, or Firm* — AMIN, TUROCY & WATSON, LLP

(57) ABSTRACT

A drive assistance device (24) for a saddle type vehicle (1) includes a ride sensor (37) configured to detect a ride attitude of a rider (J), a vehicle body behavior generating part (25) configured to generate a behavior on a vehicle body by a prescribed output, and a controller (27) configured to control driving of the vehicle body behavior generating part (25), the vehicle body behavior generating part (25) includes a brake device (BR) configured to brake a host vehicle, and wherein, when the brake device (BR) is actuated regardless of an operation of the rider (J), the controller (27) actuates
(Continued)

the brake device (BR) according to the ride attitude of the rider (J) detected by the ride sensor (37).

9 Claims, 14 Drawing Sheets

(51) Int. Cl.
*B60T 8/1755* (2006.01)
*B62L 3/00* (2006.01)
(52) U.S. Cl.
CPC ....... *B60T 2220/02* (2013.01); *B60T 2230/02* (2013.01); *B60T 2230/03* (2013.01)
(58) Field of Classification Search
USPC .......................................................... 701/82
See application file for complete search history.

(56) References Cited

U.S. PATENT DOCUMENTS

| | | | | |
|---|---|---|---|---|
| 2005/0233285 | A1* | 10/2005 | Miyamaru | G09B 9/058 434/61 |
| 2010/0114468 | A1* | 5/2010 | Field | B62J 17/08 701/124 |
| 2011/0074139 | A1* | 3/2011 | Kobayashi | B62J 27/20 280/730.1 |
| 2012/0181765 | A1* | 7/2012 | Hill | B62K 5/10 903/902 |
| 2016/0031525 | A1* | 2/2016 | Craven | G05D 3/10 180/206.7 |
| 2016/0039421 | A1* | 2/2016 | Kaneta | B60W 10/04 477/73 |
| 2016/0325739 | A1* | 11/2016 | Litz | G05D 1/0891 |
| 2017/0259872 | A1* | 9/2017 | Iwamoto | B62J 45/42 |
| 2017/0327109 | A1* | 11/2017 | Watanabe | F02B 61/02 |
| 2018/0208189 | A1 | 7/2018 | Ginther et al. | |
| 2018/0281878 | A1* | 10/2018 | Aoki | B62D 55/116 |
| 2019/0047554 | A1* | 2/2019 | Vaughn | G05D 1/0088 |

FOREIGN PATENT DOCUMENTS

| | | | | | |
|---|---|---|---|---|---|
| DE | 102017125999 | A1 | * | 5/2018 | ......... B60G 17/0165 |
| DE | 102018209048 | A1 | * | 12/2019 | ............... B60Q 9/00 |
| DE | 102018219614 | A1 | * | 5/2020 | |
| GB | 2494496 | A | * | 3/2013 | ............. B62J 27/00 |
| JP | 2006-315663 | | | 11/2006 | |
| JP | 2017-206168 | | | 11/2017 | |
| JP | 2017-206169 | | | 11/2017 | |
| JP | 2018043662 | A | * | 3/2018 | ............ B62J 50/225 |
| JP | 2018-118716 | | | 8/2018 | |
| JP | 2018-197071 | | | 12/2018 | |
| JP | 2020-158076 | | | 10/2020 | |
| JP | 2020158067 | A | * | 10/2020 | |
| JP | 2020158076 | A | * | 10/2020 | ................ B60T 7/14 |
| WO | WO-2010137608 | A1 | * | 12/2010 | ................ B62J 1/08 |
| WO | WO-2018111216 | A1 | * | 6/2018 | ............... A61B 5/11 |
| WO | WO-2018122887 | A1 | * | 7/2018 | ............... B62J 99/00 |
| WO | WO-2018179399 | A1 | * | 10/2018 | ............ B60W 30/14 |
| WO | 2018/216308 | | | 11/2018 | |
| WO | 2020158067 | A | * | 10/2020 | ............ B60T 8/1706 |
| WO | WO-2020202262 | A1 | * | 10/2020 | ................ B60T 7/12 |
| WO | WO-2020202264 | A1 | * | 10/2020 | |
| WO | WO-2020202290 | A1 | * | 10/2020 | |
| WO | WO-2021065671 | A1 | * | 4/2021 | ............. B62J 50/22 |
| WO | WO-2021102291 | A1 | * | 5/2021 | ............. A41D 1/002 |
| WO | WO-2023069793 | A1 | * | 4/2023 | ............ B65J 9/1664 |

OTHER PUBLICATIONS

International Search Report and Written Opinion for International Application No. PCT/JP2019/014034 dated Jun. 11, 2019, 6 pages.
Indian Office Action for Indian Patent Application No. 202117042079 dated Jun. 9, 2022.
Japanese Office Action for Japanese Patent Application No. 2021-510604 dated Aug. 16, 2022.

* cited by examiner

DRIVE ASSISTANCE DEVICE FOR SADDLE TYPE VEHICLE

TECHNICAL FIELD

The present invention relates to a drive assistance device for a saddle type vehicle.

BACKGROUND ART

For example, Patent Literature 1 discloses a method of operating autonomous braking of a saddle type vehicle. In Patent Literature 1, a controller identifies a trigger of an autonomous braking event of a brake. The controller is in electrical communication with a rider sensor system. The rider sensor system includes one or both of the following components. One is a rider recognition sensor (for example, a camera) operable to detect a parameter for rider recognition and report a rider recognition status to the controller. The other one is a rider body sensor (for example, a grip sensor) operable to detect a parameter related to a body between the rider and the vehicle and report a rider body participation status to the controller.

CITATION LIST

Patent Literature

[Patent Literature 1]
Japanese Unexamined Patent Application, First Publication No. 2018-118716

SUMMARY OF INVENTION

Technical Problem

In the related art, a grip sensor detects a pressure applied to the grip, and thus, detects that the rider is putting his/her hand on the grip. However, there is no disclosure of the technical scope of determining a ride attitude of a rider from detection information of a grip sensor or the like, and reflecting the result in automatic control.

Here, the present invention is directed to providing a drive assistance device for a saddle type vehicle capable of determining a ride attitude of a rider from a sensor mounted on a vehicle and operating automatic control.

Solution to Problem

In order to achieve the aforementioned objects, a first aspect of the present invention is a drive assistance device for a saddle type vehicle including: a ride sensor (37) configured to detect a ride attitude of a rider (J); a vehicle body behavior generating part (25) configured to generate a behavior on a vehicle body by a prescribed output; and a controller (27) configured to control driving of the vehicle body behavior generating part (25), wherein the vehicle body behavior generating part (25) comprises a brake device (BR) configured to brake a host vehicle, and wherein, when the brake device (BR) is actuated regardless of an operation of the rider (J), the controller (27) actuates the brake device (BR) according to the ride attitude of the rider (J) detected by the ride sensor (37).

According to this configuration, when a condition of automatic brake control is satisfied, an automatic brake is turned ON/OFF or an actuation level is adjusted according to a ride attitude of the rider. Accordingly, when the rider is at a driving attitude, which is not regular, such as one-hand driving or the like, and it is expected that the attitude of the rider is greatly disturbed by the vehicle body behavior due to the automatic brake, a countermeasure of decreasing the output of the automatic brake or the like becomes possible. Accordingly, disturbance on the attitude of the rider can be minimized.

A second aspect of the present invention is a drive assistance device for a saddle type vehicle including: a ride sensor (37) configured to detect a ride attitude of a rider (J); a vehicle body behavior generating part (25) configured to generate a behavior on a vehicle body by a prescribed output; and a controller (27) configured to control driving of the vehicle body behavior generating part (25), wherein the vehicle body behavior generating part (25) comprises a steering device (ST) configured to steer a host vehicle, and wherein, when the steering device (ST) is actuated regardless of an operation of the rider (J), the controller (27) actuates the steering device (ST) according to the ride attitude of the rider (J) detected by the ride sensor (37).

According to this configuration, when the condition of the automatic steering control is satisfied, automatic steering is turned ON/OFF or an actuation level is adjusted according to a ride attitude of the rider. Accordingly, when the rider is at a driving attitude, which is not regular, such as one-hand driving or the like, and it is expected that the attitude of the rider is greatly disturbed by the vehicle body behavior due to the automatic steering, a countermeasure of decreasing the output of the automatic steering or the like becomes possible. Accordingly, disturbance on the attitude of the rider can be minimized.

According to a third aspect of the present invention, in the first or second aspect, a handle (20) to which the rider (J) performs a steering operation, wherein the ride sensor (37) comprises a grip sensor (20c) that is disposed on a grip (20a) of the handle (20) and that is configured to detect a gripped state by the rider (J), and the controller (27) actuates the vehicle body behavior generating part (25) according to the gripped state of the rider (J) detected by the grip sensor (20c).

According to this configuration, the automatic control is turned ON/OFF or the actuation level is adjusted according to a gripped state of the handle grip by the rider. Accordingly, when the rider is at a driving attitude that is not regular and it is expected that the attitude of the rider is greatly disturbed by the vehicle body behavior due to automatic control, a countermeasure of decreasing the output of the automatic control or the like becomes possible. Accordingly, disturbance on the attitude of the rider can be minimized.

According to a fourth aspect of the present invention, in the third aspect, the handle (20) includes a pair of left and right grips (20a), the ride sensor (37) includes a pair of left and right grip sensors (20c) disposed on the pair of left and right grips (20a), respectively, and the controller (27) actuates the vehicle body behavior generating part (25) according to a crosswise difference of the gripped state of the rider (J) detected by the pair of left and right grip sensors (20c).

According to this configuration, the automatic control is turned ON/OFF and the actuation level is adjusted according to a crosswise difference between the gripped states of the left and right grips by the rider. Accordingly, when the rider is at a driving attitude that is not regular and it is expected that the attitude of the rider is greatly disturbed by the vehicle body behavior due to automatic control, a countermeasure of decreasing the output of the automatic control or the like becomes possible. Accordingly, disturbance on the attitude of the rider can be minimized.

According to a fifth aspect of the present invention, in the third aspect, the grip sensor (20c) detects a load direction with respect to the grip (20a), and the controller (27) actuates the vehicle body behavior generating part (25) according to the load direction detected by the grip sensor (20c).

According to this configuration, the automatic control is turned ON/OFF or the actuation level is adjusted according to the load direction with respect to the grip of the handle by the rider. Accordingly, when the rider is at a driving attitude that is not regular and it is expected that the attitude of the rider is greatly disturbed by the vehicle body behavior due to automatic control, a countermeasure of decreasing the output of the automatic control or the like becomes possible. Accordingly, disturbance on the attitude of the rider can be minimized.

According to a sixth aspect of the present invention, in the third aspect, the grip sensor (20c) detects an oscillation frequency of the grip (20a), and the controller (27) actuates the vehicle body behavior generating part (25) according to the oscillation frequency detected by the grip sensor (20c).

According to this configuration, the automatic control is turned ON/OFF or the actuation level is adjusted according to a change in oscillation frequency due to existence of gripping of the handle grip by the rider. Accordingly, when the rider is at a driving attitude that is not regular and it is expected that the attitude of the rider is greatly disturbed by the vehicle body behavior due to automatic control, a countermeasure of decreasing the output of the automatic control or the like becomes possible. Accordingly, disturbance on the attitude of the rider can be minimized.

According to a seventh aspect of the present invention, in any one of the first to sixth aspects, includes a step (14s) on which the rider (J) puts his/her legs, wherein the ride sensor (37) includes a step sensor (14c) disposed on the step (14s), and wherein the controller (27) actuates the vehicle body behavior generating part (25) according to the footrest state of the rider (J) detected by the step sensor (14c).

According to this configuration, the automatic control is turned ON/OFF or the actuation level is adjusted according to the footrest state to the step by the rider. Accordingly, when the rider is at a driving attitude, which is not regular, such as removal of legs from the step, and it is expected that the attitude of the rider is greatly disturbed by the vehicle body behavior due to automatic control, a countermeasure of decreasing the output of the automatic control or the like becomes possible. Accordingly, disturbance on the attitude of the rider can be minimized.

According to an eighth aspect of the present invention, in the seventh aspect, includes a pair of left and right steps (14s) on both sides of a vehicle body, the ride sensor (37) includes a pair of left and right step sensors (14c) disposed on the pair of left and right steps (14s), respectively, and the controller (27) actuates the vehicle body behavior generating part (25) according to a crosswise difference between the footrest states of the rider (J) detected by the pair of left and right step sensors (14c).

According to this configuration, the automatic control is turned ON/OFF or the actuation level is adjusted according to a crosswise difference between the footrest states to the steps by the rider. Accordingly, when the rider is at a driving attitude that is not regular and it is expected that the attitude of the rider is greatly disturbed by the vehicle body behavior due to automatic control, a countermeasure of decreasing the output of the automatic control or the like becomes possible. Accordingly, disturbance on the attitude of the rider can be minimized.

According to a third aspect of the present invention, in the seventh aspect, the step sensor (14c) detects a load direction with respect to the step (14s), and the controller (27) actuates the vehicle body behavior generating part (25) according to the load direction detected by the step sensor (14c).

According to this configuration, the automatic control is turned ON/OFF or the actuation level is adjusted according to a footrest load direction with respect to the step by the rider. Accordingly, when the rider is at a driving attitude that is not regular and it is expected that the attitude of the rider is greatly disturbed by the vehicle body behavior due to automatic control, a countermeasure of decreasing the output of the automatic control or the like becomes possible. Accordingly, disturbance on the attitude of the rider can be minimized.

According to a tenth aspect of the present invention, in the seventh aspect, the step sensor (14c) detects an oscillation frequency of the step (14s), and wherein the controller (27) actuates the vehicle body behavior generating part (25) according to the oscillation frequency detected by the step sensor (14c).

According to this configuration, by setting the level (strength) of the automatic control according to a change of the oscillation frequency due to presence of the footrest load with respect to the step by the rider, when the rider is at a driving attitude that is not regular and it is expected that the attitude of the rider is greatly disturbed due to automatic control, a countermeasure of decreasing the output of the automatic control or the like becomes possible. Accordingly, disturbance on the attitude of the rider can be minimized.

Advantageous Effects of Invention

According to the present invention, it is possible to provide a drive assistance device for a saddle type vehicle capable of determining a ride attitude of a rider from a sensor mounted on a vehicle and operating automatic control.

BRIEF DESCRIPTION OF DRAWINGS

FIG. 15(a) shows a comparative example, and FIG. 15(b) shows a practical example.

DESCRIPTION OF EMBODIMENTS

Hereinafter, an example of a vehicle system of an embodiment will be described with reference to the accompanying drawings.

In the embodiment, the vehicle system is applied to an automatic driving vehicle. Here, there are levels in automatic driving. The level in automatic driving can be determined by a scale such as, for example, whether the level is less than a predetermined reference or whether the level is equal to or greater than the predetermined reference. The level in the automatic driving being less than the predetermined reference may be, for example, a case in which manual driving is performed or a case in which only a drive assistance device such as an adaptive cruise control system (ACC), a lane keeping assistance system (LKAS), or the like, is operated. The driving mode in which the level in the automatic driving is less than the predetermined reference is an example of "a first driving mode." In addition, the level in the automatic driving being equal to or greater than the predetermined reference may be, for example, a case in which a control level is higher than that in the ACC or the LKAS and a drive assistance device such as auto lane changing (ALC), low speed car passing (LSP), or the like, is actuated, or a case in which automatic driving automatically performed to lane change, merging or diverging is executed. The driving mode in which the level in the automatic driving is equal to or greater than the predetermined reference is an example of "a second driving mode." The predetermined reference can be arbitrarily set. In the embodiment, the first driving mode is manual driving, and the second driving mode is automatic driving.

<Entire System>

Figure 1:
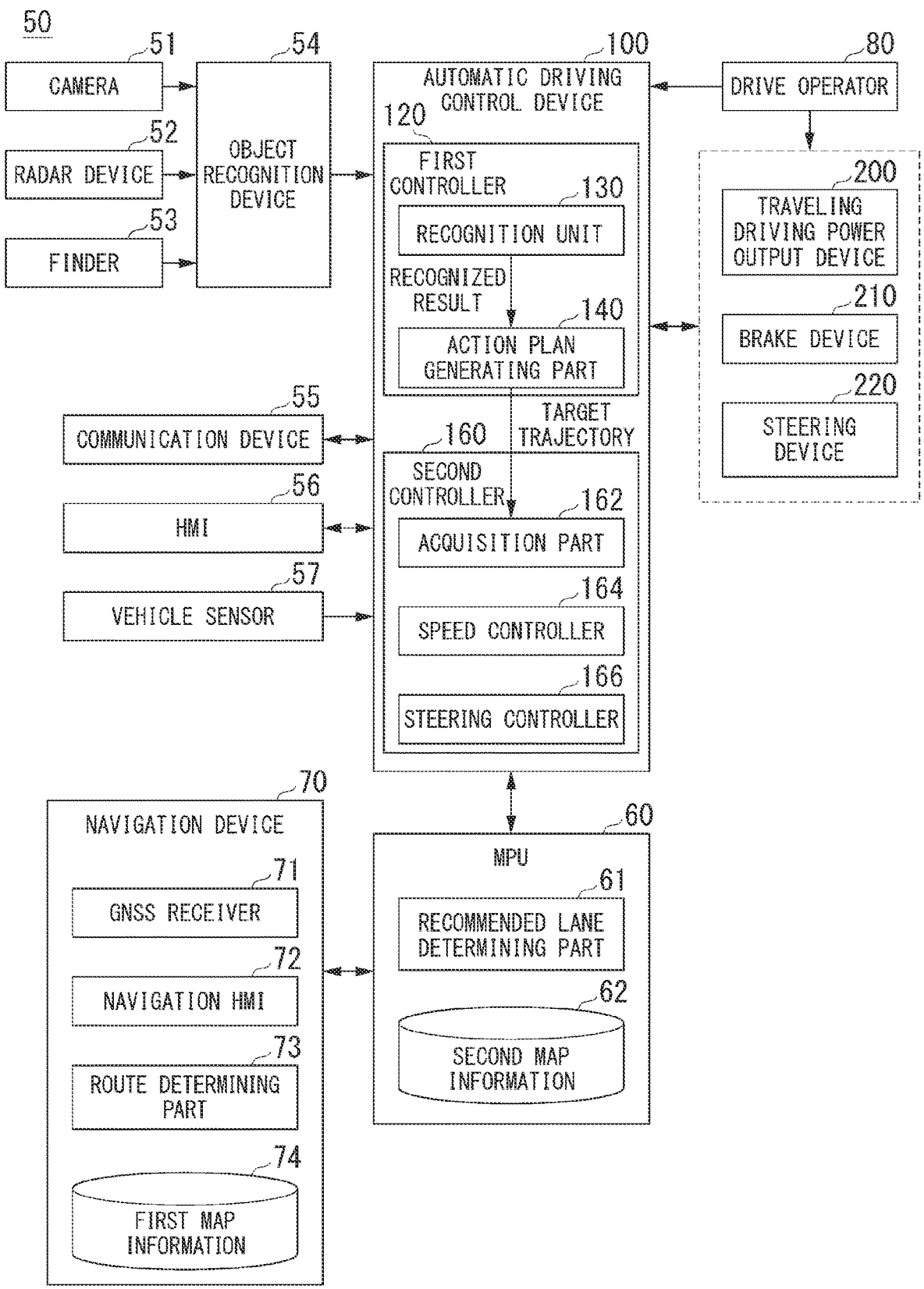
FIG. 1 is a configuration view of a vehicle system of an embodiment of the present invention.

FIG. 1 is a configuration view of a vehicle system 50 according to an embodiment. A vehicle on which the vehicle system 50 is mounted is, for example, a two-wheeled, three-wheeled, or four-wheeled vehicle, and a driving source thereof is an internal combustion engine such as a gasoline engine, a diesel engine, or the like, an electric motor, or a combination of these. The electric motor is operated using an output generated by a generator connected to the internal combustion engine, or discharged energy of a secondary battery or a fuel cell.

The vehicle system 50 includes, for example, a camera 51, a radar device 52, a finder 53, an object recognition device 54, a communication device 55, a human machine interface (HMI) 56, a vehicle sensor 57, a navigation device 70, a map positioning unit (MPU) 60, a drive operator 80, an automatic driving control device 100, a traveling driving force output device 200, a brake device 210, and a steering device 220. These devices or instruments are connected to each other by a multiple communication line such as a controller area network (CAN) communication line or the like, a serial communication line, a wireless communication network, or the like. Further, the configuration shown in FIG. 1 is merely an example, a part of the configuration may be omitted, and another configuration may be added.

The camera 51 is, for example, a digital camera using a solid-state image sensing device such as a charge coupled device (CCD), a complementary metal oxide semiconductor (CMOS), or the like. The camera 51 is attached to an arbitrary place of a vehicle (hereinafter, a host vehicle M) on which the vehicle system 50 is mounted. When a side in front of the host vehicle M is imaged, the camera 51 is attached to an upper section of a front windshield, a rear surface of a rearview mirror, or the like. In the case of a saddle type vehicle such as a two-wheeled vehicle or the like, the camera 51 is attached to steered system parts or exterior parts or the like on the side of a vehicle body that supports the steered system parts. The camera 51, for example, images the surroundings of the host vehicle M periodically and repeatedly. The camera 51 may be a stereo camera.

The radar device 52 radiates radio waves such as millimeter waves or the like to the surroundings of the host vehicle M, and simultaneously, detects the radio waves (reflected waves) reflected by the object to detect at least a position (a distance and an azimuth) of the object. The radar device 52 is attached to an arbitrary place of the host vehicle M. The radar device 52 may detect a position and a speed of the object using a frequency modulated continuous wave (FM-CW) method.

The finder 53 is light detection and ranging (LIDAR). The finder 53 radiates light to surroundings of the host vehicle M, and measures scattered light. The finder 53 detects a distance to a target on the basis of a time from emission to reception of light. The radiated light is, for example, a pulse-shaped laser beam. The finder 53 is attached to an arbitrary place of the host vehicle M.

The object recognition device 54 recognizes a position, a type, a speed, or the like, of the object by performing sensor fusion processing with respect to the detection result of some or all of the camera 51, the radar device 52, and the finder 53. The object recognition device 54 outputs the recognized result to the automatic driving control device 100. The object recognition device 54 may output the detection results of the camera 51, the radar device 52, and the finder 53 to the automatic driving control device 100 as they are. The object recognition device 54 may be omitted from the vehicle system 50.

The communication device 55 uses, for example, a cellular network, a Wi-Fi network, Bluetooth (registered trademark), dedicated short range communication (DSRC), or the like, comes in communication with other vehicles present in the vicinity of the host vehicle M, or comes in communication with various server devices via a radio base station.

The HMI 56 receives an input operation by an occupant in the host vehicle M while providing various types of information to the occupant. The HMI 56 includes various display devices, a speaker, a buzzer, a touch panel, a switch, a key, or the like.

The vehicle sensor 57 includes a vehicle speed sensor configured to detect a speed of the host vehicle M, an acceleration sensor configured to detect an acceleration, a yaw rate sensor configured to detect an angular speed around a vertical axis, and an azimuth sensor configured to detect an orientation of the host vehicle M.

The navigation device 70 includes, for example, a global navigation satellite system (GNSS) receiver 71, a navigation HMI 72, and a route determining part 73. The navigation device 70 holds first map information 74 in a storage device such as a hard disk drive (HDD), a flash memory, or the like. The GNSS receiver 71 specifies a position of the host vehicle M on the basis of the signal received from GNSS satellites. The position of the host vehicle M may be specified or complemented by an inertial navigation system (INS) using the output of the vehicle sensor 57. The navigation HMI 72 includes a display device, a speaker, a touch panel, a key, and the like. The navigation HMI 72 may be shared with a part or the entirety of the HMI 56 described above. The route determining part 73 determines, for example, a route to a destination input by an occupant using the navigation HMI 72 (hereinafter, a route on a map) from a position of the host vehicle M specified by the GNSS receiver 71 (or an input arbitrary position) with reference to the first map information 74. The first map information 74 is, for example, information in which a road shape is expressed by a link showing a road and a node connected by the link. The first map information 74 may include a curvature of a road, point of interest (POI) information, or the like. The route on a map is output to the MPU 60. The navigation device 70 may perform route guidance using the navigation HMI 72 on the basis of the route on a map. The navigation device 70 may be realized by, for example, a function of a terminal device such as a smart phone, a tablet terminal, or the like, held by the occupant. The navigation device 70 may transmit the current position and the destination to the navigation server via the communication device 55, and acquire the same route as the route on a map from the navigation server.

The MPU 60 includes, for example, a recommended lane determining part 61, and holds second map information 62 in a storage device such as an HDD, a flash memory, or the like. The recommended lane determining part 61 divides the route on a map provided from the navigation device 70 into a plurality of blocks (for example, divided at each 100 [m] in a direction in which the vehicle advances), and determines a recommended lane at each block with reference to the second map information 62. The recommended lane determining part 61 performs determination regarding on what numbered lane from the left the vehicle will travel. The recommended lane determining part 61 determines a recommended lane such that the host vehicle M can travel on a reasonable route to go to a branch destination when a diverging place is present on the route on a map.

The second map information 62 is map information that is more precise than the first map information 74. The second map information 62 includes, for example, information of a center of a lane, information of a boundary of a lane, or the like. In addition, the second map information 62 may include road information, traffic regulation information, address information (address/zip code), facility information, telephone number information, and the like. The second map information 62 may be updated at any time by the communication device 55 in communication with another device.

The drive operator 80 includes, for example, an accelerator pedal (and a grip), a brake pedal (and a lever), a shift lever (and a pedal), a steering wheel (and a bar handle), heteromorphic steering, a joystick, and other operators. A sensor configured to detect an operation amount or an existence of an operation is attached to the drive operator 80, and the detection result is output to some or all of the automatic driving control device 100, the traveling driving force output device 200, the brake device 210, and the steering device 220.

The automatic driving control device 100 includes, for example, a first controller 120 and a second controller 160. The first controller 120 and the second controller 160 are realized by executing a program (software) using a hardware processor such as a central processing unit (CPU) or the like. In addition, some or all of these components may be realized by hardware (a circuit part; including a circuitry) such as large scale integration (LSI), an application specific integrated circuit (ASIC), a field-programmable gate array (FPGA), a graphics processing unit (GPU), or the like, or may be realized by cooperation of software and hardware.

The first controller 120 includes, for example, a recognition part 130 and an action plan generating part 140. The first controller 120 realizes, for example, both of a function of artificial intelligence (AI) and a function of a previously provided model at the same time. For example, a function of "recognizing a crossroad" is executed parallel to recognition of a crossroad through deep learning or the like and recognition based on a previously provided condition (a signal that enables matching of patterns, road markings, or the like), and may be realized by scoring and comprehensively evaluating them. Accordingly, reliability of automatic driving is guaranteed.

The recognition part 130 recognizes a state such as a position, a speed, an acceleration, and the like, of an object (another vehicle or the like) around the host vehicle M on the basis of information input from the camera 51, the radar device 52, and the finder 53 via the object recognition device 54. The position of the object may be recognized as, for example, a position on absolute coordinates using a representative point (a center of gravity, a driving shaft center, or the like) of the host vehicle M as an origin and used for control. The position of the object may be expressed at a representative point such as a center of gravity, a corner, or the like, of the object, or may be represented as an expressed region. "A state" of the object may include an acceleration or a jerk of the object, or "an action state" (for example, whether lane change is being performed or about to be performed).

In addition, the recognition part 130 recognizes, for example, a lane (a traveling lane) along which the host vehicle M travels. For example, the recognition part 130 recognizes a traveling lane by comparing a pattern (for example, arrangement of solid line and broken lines) of road marking lines obtained from the second map information 62, and a pattern of road marking lines around the host vehicle M recognized from the image captured by the camera 51. Further, the recognition part 130 may recognize the traveling lane by recognizing traveling lane boundaries (road boundaries) including road marking lines, road shoulders, curbstones, median strips, guardrails, and the like, while not being limited to road marking lines. In the recognition, the position of the host vehicle M acquired from the navigation device 70 or a processing result by the INS may be added. In addition, the recognition part 130 may recognize a temporary stop line, an obstacle, a red signal, a tollgate, and other road events.

The recognition part 130 recognizes a position or an attitude of the host vehicle M with respect to the traveling lane when the traveling lane is recognized.

Figure 2:
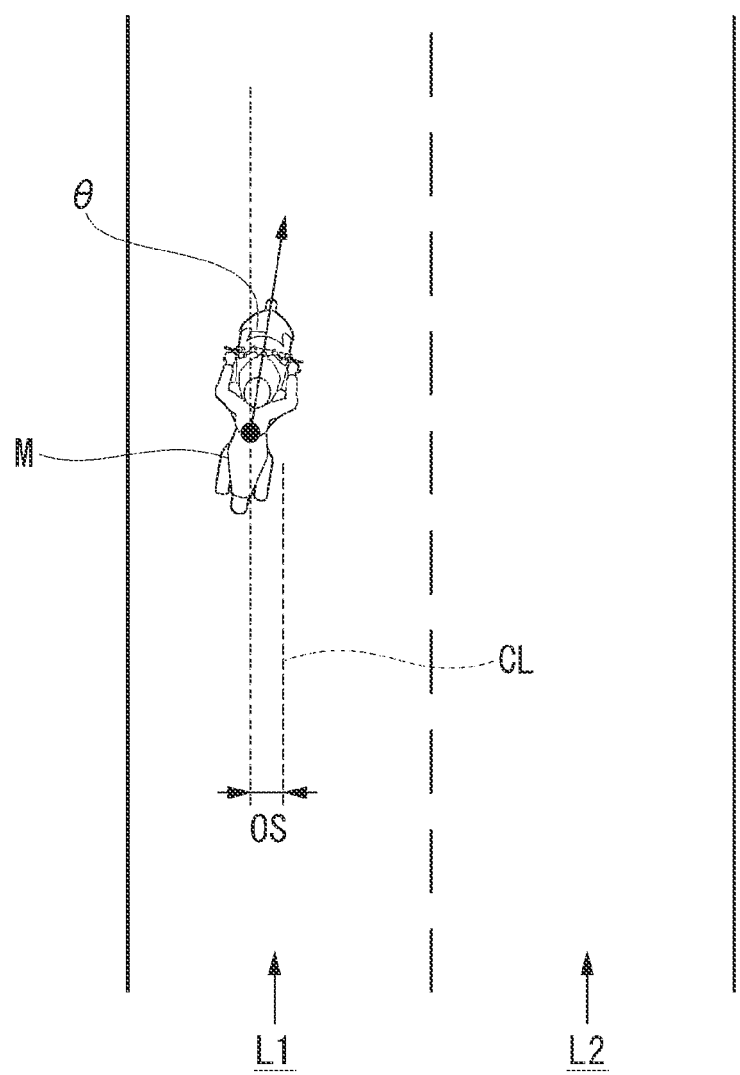
FIG. 2 is a view for explaining an aspect in which a relative position and an attitude of a host vehicle with respect to a traveling lane are recognized by a recognition part of the vehicle system.

FIG. 2 is a view showing an example of an aspect in which a relative position and an attitude of the host vehicle M with respect to a traveling lane L1 are recognized by the recognition part 130. The recognition part 130 may recognize, for example, a separation OS from a traveling lane center CL of a reference point (for example, a center of gravity) of the host vehicle M and an angle θ with respect to a line connecting the traveling lane centers CL in a direction in which the host vehicle M advances as a relative position and an attitude of the host vehicle M with respect to the traveling lane L1. In addition, instead of this, the recognition part 130 may recognize a position or the like of reference points of the host vehicle M with respect to a side end portion from any position of the traveling lane L1 (road marking lines or road boundaries) as a relative position of the host vehicle M with respect to the traveling lane.

Returning to FIG. 1, the action plan generating part 140 generates a target trajectory along which the host vehicle M automatically (regardless of a driver's operation) travels in the future so that the host vehicle travels a recommended lane determined by the recommended lane determining part 61 in principle, and further, so that the hose vehicle can correspond to a surrounding situation of the host vehicle M. The target trajectory includes, for example, a speed element. For example, the target trajectory is expressed as the order of the points (trajectory points) to be reached by the host vehicle M. The trajectory point is a point at which the host vehicle M will arrive after each of predetermined traveling distances (for example, about several [m]) by a road distance, and separately from this, the target speed and the target acceleration are generated as a part of the target trajectory for every predetermined sampling time (for example, about every several fractions of a [sec]). In addition, the trajectory point may be a position at which the host vehicle M will arrive in the sampling time for every predetermined sampling time. In this case, information of the target speed or the target acceleration is expressed as intervals between the trajectory points.

The action plan generating part 140 may set the automatic driving event when the target trajectory is generated. The automatic driving event includes, for example, a fixed speed traveling event in which the host vehicle M travels along the same traveling lane at a fixed speed, a following traveling event in which the host vehicle M travels to follow a preceding vehicle, a lane change event in which a traveling lane of the host vehicle M is changed, a diverging event in which the host vehicle M travels in a target direction at a diverging point of a road, a merging event in which the host vehicle M merges at a merging point, an overtaking event in which the host vehicle M overtakes a preceding vehicle, and the like. The action plan generating part 140 generates a target trajectory according to the started event.

Figure 3:
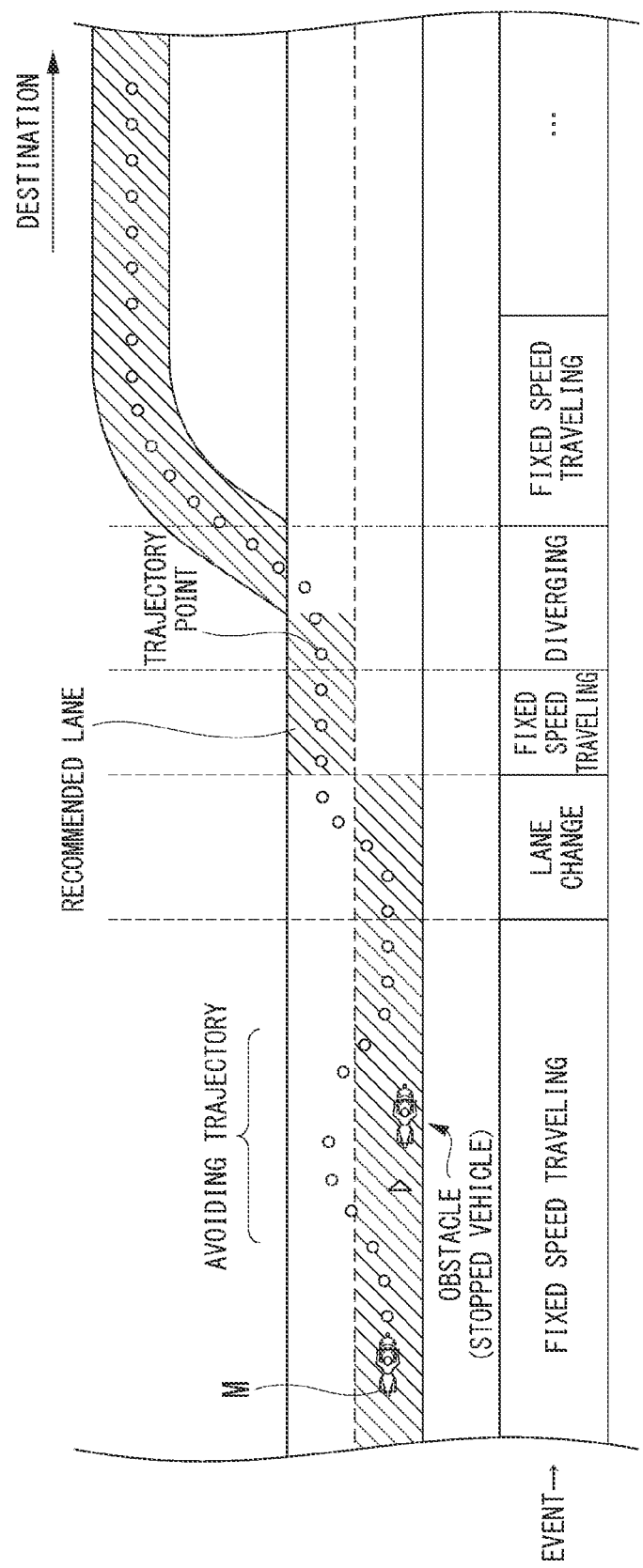
FIG. 3 is a view for explaining an aspect in which a target trajectory is generated on the basis of a recommended lane in the vehicle system.

FIG. 3 is a view showing an aspect in which the target trajectory is generated on the basis of the recommended lane. As shown, the recommended lane is set to be convenient for traveling along the route to the destination. The action plan generating part 140 starts a lane change event, a diverging event, a merging event, or the like, when the host vehicle M approaches a predetermined distance before a switching point of the recommended lane (may be determined according to the type of event). In execution of each event, when there is necessity of avoiding an obstacle, an avoiding trajectory as shown is generated.

Returning to FIG. 1, the second controller 160 controls the traveling driving force output device 200, the brake device 210, and the steering device 220 such that the host vehicle M passes through the target trajectory generated by the action plan generating part 140 at a scheduled time.

The second controller 160 includes, for example, an acquisition part 162, a speed controller 164, and a steering controller 166. The acquisition part 162 acquires information of the target trajectory (trajectory points) generated by the action plan generating part 140, and stores the acquired information in a memory (not shown). The speed controller 164 controls the traveling driving force output device 200 or the brake device 210 on the basis of the speed element associated with the target trajectory stored in the memory. The steering controller 166 controls the steering device 220 according to a curve condition of the target trajectory stored in the memory. The processing of the speed controller 164 and the steering controller 166 are realized by, for example, combination of feedforward control and feedback control. As an example, the steering controller 166 combines the feedforward control according to the curvature of the road in front of the host vehicle M and the feedback control based on the separation from the target trajectory and executes the combination.

The traveling driving force output device 200 outputs a traveling driving force (torque) to a driving wheel such that the host vehicle M travels. The traveling driving force output device 200 includes, for example, combination of an internal combustion engine, an electric motor, a gearbox, and the like, and an electronic control unit (ECU) configured to control them. The ECU controls the above-mentioned configuration according to the information input from the second controller 160 or the information input from the drive operator 80.

The brake device 210 includes, for example, a brake caliper, a cylinder configured to transmit a hydraulic pressure to the brake caliper, an electric motor configured to generate a hydraulic pressure in the cylinder, and a brake ECU. The brake ECU controls the electric motor according to the information input from the second controller 160 or the information input from the drive operator 80 such that the brake torque according to the braking operation is output to each wheel. The brake device 210 may include a mechanism configured to transmit a hydraulic pressure generated by an operation of the brake operator included in the drive operator 80 to the cylinder via the master cylinder as a backup. Further, the brake device 210 is not limited to the above-mentioned configuration and may be an electronically controlled hydraulic brake device configured to control an actuator according to the information input from the second controller 160 and transmit a hydraulic pressure of the master cylinder to the cylinder.

The steering device 220 includes, for example, a steering ECU and an electric motor. The electric motor changes an orientation of a steered wheel by, for example, applying a force to a rack and pinion mechanism. The steering ECU drives the electric motor and changes an orientation of the steered wheel according to the information input from the second controller 160 or the information input from the drive operator 80.

<Entire Vehicle>

Next, a motorcycle that is an example of a saddle type vehicle according to the embodiment will be described. Further, directions of forward, rearward, leftward, rightward, and so on, in the following description are the same as directions in a vehicle described below unless the context clearly indicates otherwise. In addition, in appropriate places in the drawings used in the following description, an arrow FR indicates a forward direction with respect to a vehicle, and an arrow UP indicates an upward direction with respect to the vehicle.

Figure 4:
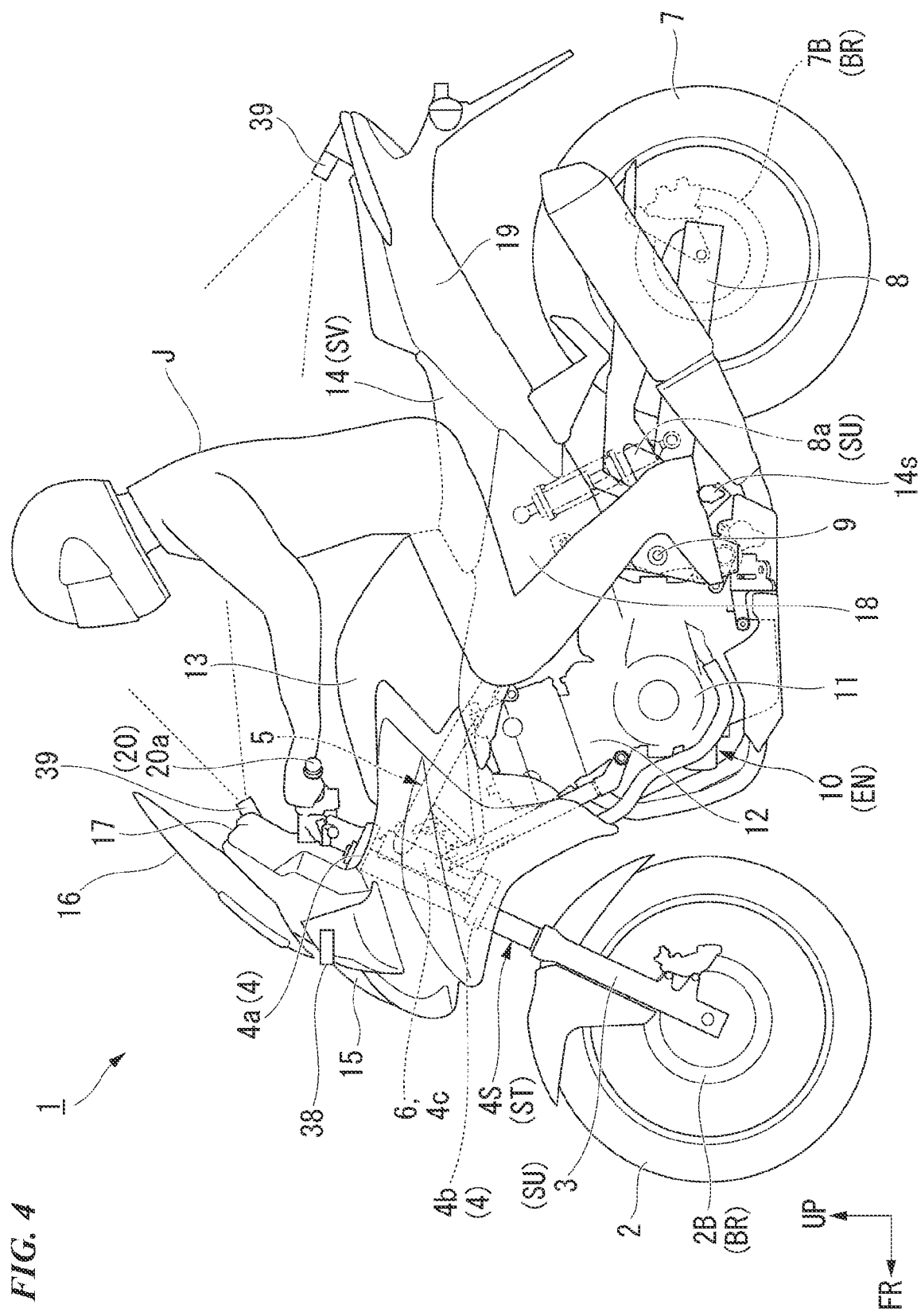
FIG. 4 is a left side view of a motorcycle of an embodiment.

As shown in FIG. 4, a front wheel 2 that is a steering wheel of a motorcycle 1 is supported by lower end portions of a pair of left and right front forks 3. Upper sections of the left and right front forks 3 are steerably supported by a head pipe 6 of a front end portion of a vehicle body frame 5 via a steering stem 4. The steering stem 4 includes a steering shaft 4c inserted through and pivotably supported by the head pipe 6, and upper and lower bridge members (a top bridge 4a and a bottom bridge 4b) fixed to upper and lower end portions of the steering shaft 4c, respectively. A bar type handle 20 is attached to at least one of the upper section (the top bridge 4a) of the steering stem 4 and the left and right front forks 3. The handle 20 includes a pair of left and right grips 20a gripped by a rider (a driver) J. In the drawings, reference sign 4S indicates a steering mechanism including the steering stem 4 and the left and right front forks 3, and reference sign ST indicates a steering device including the steering mechanism 4S and a steering actuator 43 (see FIG. 5).

A rear wheel 7 that is a driving wheel of the motorcycle 1 is supported by a rear end portion of a swing arm 8 extending below a rear section of a vehicle body in a forward/rearward direction. A front end portion of the swing arm 8 is vertically swingably supported by a pivot section 9 of a longitudinal intermediate section of the vehicle body frame 5. A rear cushion 8a is disposed between the front section of the swing arm 8 and the longitudinal intermediate section of the vehicle body frame 5.

Here, the motorcycle 1 includes jacks (not shown) in the left and right front forks 3 and the rear cushion 8a, and lengths (cushion lengths) of the left and right front forks 3 and the rear cushion 8a and a vehicle height can be adjusted by actuations of the jacks. In the drawings, reference sign SU indicates a vehicle height adjustment device including the left and right front forks 3 and the rear cushion 8a.

An engine (an internal combustion engine) 10 that is a prime mover is supported by the vehicle body frame 5. The engine 10 has a cylinder 12 standing above a front section of a crank case 11. A fuel tank 13 in which fuel for the engine 10 is stored is disposed above the engine 10. A seat 14 on which an occupant (a driver and a passenger on a rear part) sits is disposed behind the fuel tank 13. A pair of left and right steps 14s on which the rider J can put his/her legs are disposed at both of left and right sides under the seat 14. A front cowl 15 supported by the vehicle body frame 5 is mounted on a front section of the vehicle body. A screen 16 is provided on a front upper side of the front cowl 15. A meter device 17 is disposed on an inner side of the front cowl 15. A side cover 18 is mounted on a side portion of the vehicle body below the seat 14. A rear cowl 19 is mounted on a rear section of the vehicle body.

Here, the motorcycle 1 includes a seat moving device SV configured to tilt the seat 14 forward and rearward. The seat moving device SV tilts the seat 14 to raise or lower front and rear ends thereof. The seat moving device SV may have a function of tilting the seat 14 to raise or lower the left and right ends. The seat moving device SV includes an actuator (not shown) configured to tilt the seat 14.

Figure 5:
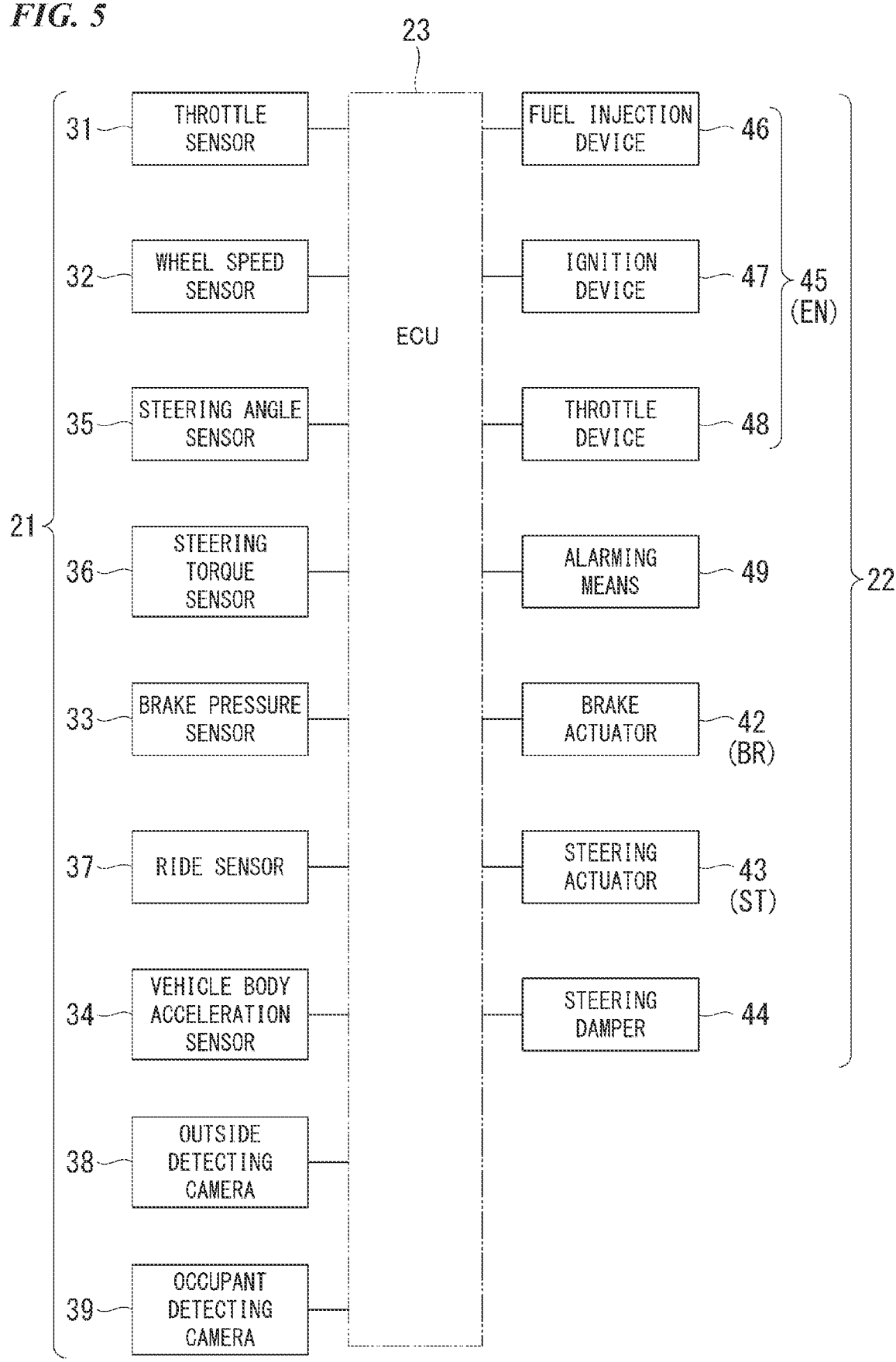
FIG. 5 is a configuration view of a control device of the motorcycle.

The motorcycle 1 includes a front wheel brake main body 2B, a rear wheel brake main body 7B, and a brake actuator 42 (see FIG. 5). Each of the front wheel brake main body 2B and the rear wheel brake main body 7B is a hydraulic disc brake. The motorcycle 1 constitutes a by-wire type brake system configured to electrically link the front wheel brake main body 2B and the rear wheel brake main body 7B to a brake operator ba such as a brake lever 2a, a brake pedal 7a (see FIG. 9), and the like, operated by the rider J. In the drawings, reference sign BR indicates a brake device including the front and rear brake main bodies 2B and 7B and the brake actuator 42.

Here, the brake device BR constitutes an interlocking front/rear brake system (a combined brake system (CBS)) configured to generate braking forces of front and rear wheels by linking the front and rear brake main bodies 2B and 7B upon operation of one of the brake lever 2a and the brake pedal 7a. In addition, the brake device BR constitutes an antilock brake system (ABS) configured to appropriately control slip ratios of front and rear wheels by depressurizing a brake pressure according to slip states of the front and rear wheels upon operations of the front and rear brake main bodies 2B and 7B.

FIG. 5 is a configuration view of a major part of the motorcycle 1 according to the embodiment.

The motorcycle 1 includes a control device 23 configured to control operations of various devices 22 based on detection information acquired from various sensors 21. The control device 23 is configured as, for example, an integrated or a plurality of electronic control devices (ECUs). The control device 23 may be at least partially realized by cooperation of software and hardware. The control device 23 includes a fuel injection controller, an ignition controller and a throttle controller, which are configured to control driving of the engine 10. The motorcycle 1 constitutes a by-wire type engine control system configured to electrically link auxiliary machinery such as a throttle device 48 or the like, and an accelerator operator such as an accelerator grip or the like operated by the rider J.

The various sensors 21 include a vehicle body acceleration sensor 34, a steering angle sensor 35, a steering torque sensor 36, a ride sensor 37, an outside detecting camera 38 and an occupant detecting camera 39, in addition to a throttle sensor 31, a wheel speed sensor 32 and a brake pressure sensor 33.

The various sensors 21 detect various operation inputs of the rider J and various states of the motorcycle 1 and the occupant. The various sensors 21 output various types of detection information to the control device 23.

The throttle sensor 31 detects an operation amount (an acceleration request) of an accelerator operator such as a throttle grip or the like.

The wheel speed sensors 32 are provided on the front and rear wheels 2 and 7, respectively. Detection information of the wheel speed sensors 32 is used for control of the ABS, traction control, and the like. The detection information of the wheel speed sensors 32 may be used as vehicle speed information transmitted to the meter device 17.

The brake pressure sensor 33 detects an operation force (a deceleration request) of the brake operator ba of the brake lever 2a, the brake pedal 7a, and the like.

The vehicle body acceleration sensor 34 is an inertial measurement device (IMU) having five axes or six axes, and detects angles (or an angular speed) of three axes ((a roll axis, a pitch axis and a yaw axis) and an acceleration in the vehicle body. Hereinafter, the vehicle body acceleration sensor 34 may be referred to as an IMU 34.

The steering angle sensor 35 is, for example, a potentiometer provided on the steering shaft 4c, and detects a pivot angle (a steering angle) of the steering shaft 4c with respect to the vehicle body.

Referring also to FIG. 4, the steering torque sensor 36 is, for example, a magneto-striction type torque sensor provided between the handle 20 and the steering shaft 4c, and detects a torsion torque (steering input) input from the handle 20 to the steering shaft 4c. The steering torque sensor 36 is an example of a load sensor configured to detect a steering force input to the handle 20 (the steering operator).

In the embodiment, the handle pivot shaft that pivotably supports the handle 20 is the same as the steering shaft 4c that steerably supports the front wheel 2.

Here, the steering mechanism 4S of the embodiment is a general term for a configuration in which the steering mechanism 4S is provided between the handle 20 and the front wheel 2 (the steering wheel) and pivotal movement of the handle 20 is transmitted to the front wheel 2. The handle pivot shaft and the steering shaft (the front wheel pivot shaft) are configured to be the same as each other, and may be provided separately from each other or on different shafts. When the handle pivot shaft and the steering shaft are provided on the different shafts, a configuration of linking the handle pivot shaft and the steering shaft is included in the steering mechanism 4S.

The ride sensor 37 detects whether the rider J is in a regular ride attitude. The ride sensor 37 may be exemplified as, for example, a seat sensor 14d disposed on the seat 14 and configured to detect whether the rider J sits on the seat, left and right grip sensors 20c disposed on left and right grips 20a of the handle 20 and configured to detect whether the rider J grips the left and right grips 20a, left and right step sensors 14c disposed on left and right steps 14s and configured to detect whether there is a footrest for the rider J, and the like.

Figure 9:
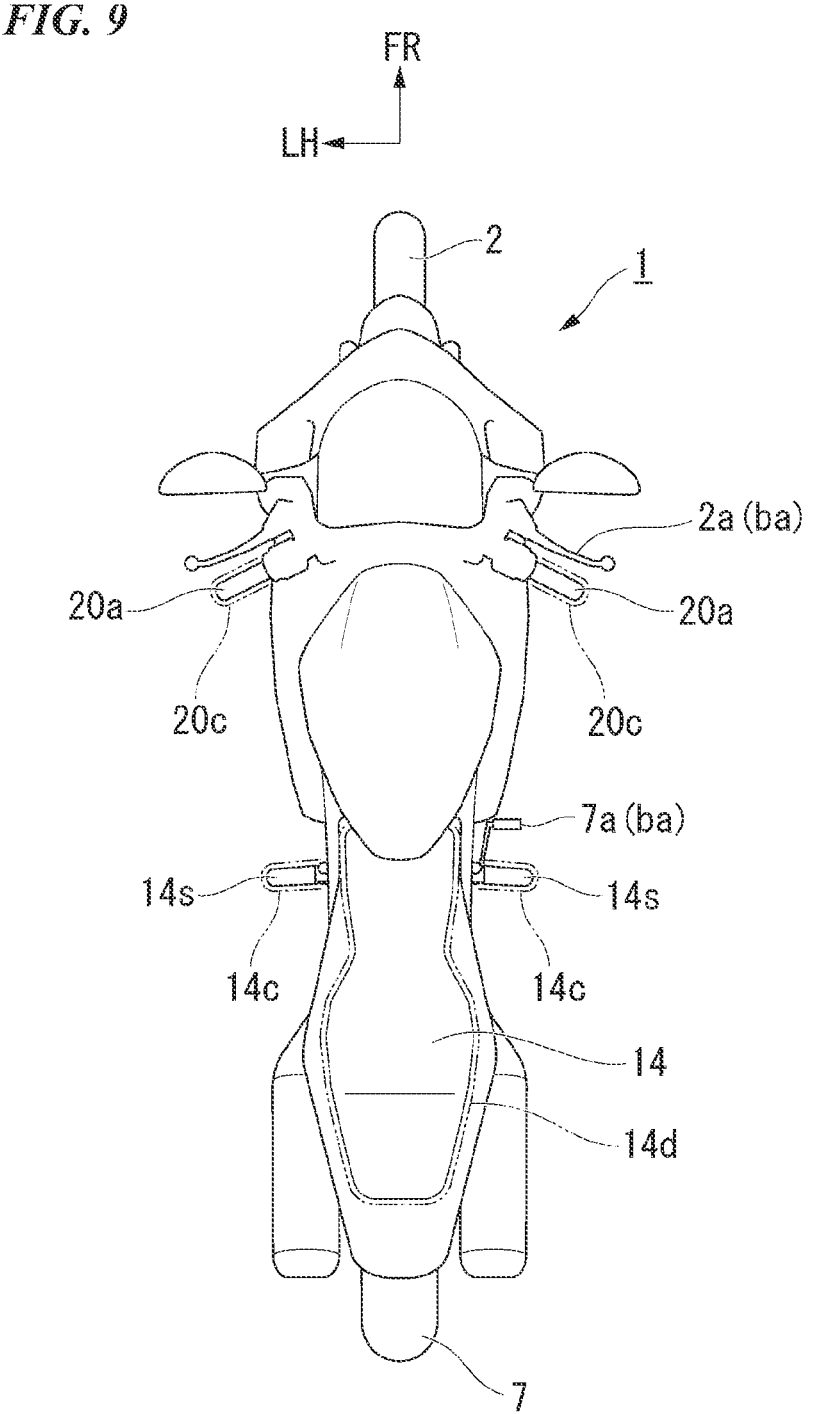
FIG. 9 is a view for explaining the motorcycle when seen from above.

Referring also to FIG. 9, the grip sensors 20c include a load sensor such as a piezoelectric sensor or the like configured to detect a degree and an orientation of a load due to gripping of the rider J, and an acceleration sensor configured to measure an oscillation frequency of the grips 20a. Information detected by the grip sensors 20c is input to the control device 23.

The step sensors 14c also include a load sensor configured to detect a degree and an orientation of a load due to the footrest of the rider J, and an acceleration sensor configured to measure an oscillation frequency of the steps 14s. Information detected by the step sensors 14c is input to the control device 23.

The seat sensor 14d includes a load sensor such as a piezoelectric sensor or the like configured to detect a degree and an orientation of a load due to sitting of the rider J. Information detected by the seat sensor 14d is input to the control device 23.

The control device 23 detects that the rider J is in a driving state corresponding to one-hand driving based on a crosswise difference in degree of the gripping load detected by the grip sensors 20c. "The driving state corresponding to the one-hand driving" is a ride attitude state that is not regular, and a state in which the attitude of the rider J is easy to be disturbed due to a behavior of the vehicle body. The control device 23 determines that the rider J is in the ride attitude that is not regular when the crosswise difference in degree of the gripping load is equal to or greater than a predetermined threshold. Here, when automatic control that causes the vehicle body behavior such as an automatic brake, automatic steering, or the like, is performed, the attitude of the rider J tends to be disturbed and lead to tiredness. When the control device 23 determines that the rider J is in the ride attitude that is not regular, it takes measures such as lowering the output of the automatic braking or automatic steering. Accordingly, the disturbance of the attitude of the rider J is suppressed.

In addition, the control device 23 detects that the rider J is in the driving state corresponding to the one-hand driving using also the crosswise difference in grip oscillation detected by the grip sensors 20c. That is, since a difference occurs in a relation between the engine rotation number and the grip oscillation frequency due to presence of gripping of the grips 20a, one-hand driving can be detected based on the crosswise difference in grip oscillation.

It is possible to accurately detect that the rider J is in the driving state corresponding to the one-hand driving using the grip load and the oscillation frequency.

Here, even when the rider J grips the left and right grips 20a, for example, in a state in which the rider J is looking back and stretching his/her limbs, like the one-hand driving, it can be said that the rider J is not in the regular driving attitude. The control device 23 detects not only the degree of the gripping load detected by the grip sensors 20c, but also an orientation of the gripping load. That is, the control device 23 determines that the rider J is in the driving attitude that is not regular also when the orientation of the gripping load is changed due to the rider J twisting the body, when the orientation of the gripping load is changed due to stretching of the rider. Even in this case, the control device 23 suppresses the disturbance of the attitude of the rider J by taking measures such as lowering the output of the automatic control. While the orientation of the gripping load may be set using the orientation downward in the vertical direction as the orientation of the reference, it may also be set by learning the orientation of the gripping load upon normal traveling without performing the automatic control.

When it is detected that the rider J is in an irregular driving attitude, alarming with respect to the rider J may be performed by actuating an alarming part 49, which will be described below, or the like. In addition, when it is detected that the rider J is in the irregular driving attitude, operations related to the acceleration of the motorcycle 1 (an operation that interferes with deceleration) such as a throttle opening operation or a shift-up operation may be disabled or invalidated. In this case, like the alarming to the rider J, notifications may be made to visual, auditory and tactile sensations of the rider J.

Returning to FIGS. 4 and 5, the outside detecting camera 38 images a situation in front of the vehicle. The outside detecting camera 38 is provided on, for example, a front end portion of the vehicle body (for example, a front end portion of the front cowl 15). The image captured by the outside detecting camera 38 is transmitted to, for example, the control device 23, subjected to appropriate image processing, and becomes desired image data to be used for various controls. That is, the information from the outside detecting camera 38 is provided for recognition of the position, type, speed, or the like, of the object in the detecting direction, and driving assist control, automatic driving control, or the like, of the vehicle is performed based on the recognition.

For example, the outside detecting camera 38 may be a camera that captures not only visible light but also invisible light such as infrared light or the like. As an outside detecting sensor instead of the outside detecting camera 38, not only an optical sensor such as a camera or the like but also a radio wave sensor such as radar or the like using microwaves such as infrared light, millimeter wave, or the like, may be used. Instead of a single sensor, a configuration including a plurality of sensors such as a stereo camera or the like may be used. A camera and radar may be used together.

The occupant detecting camera 39 is a digital camera that uses a solid state image sensing device such as a CCD, a CMOS, or the like, for example, like the outside detecting camera 38. The occupant detecting camera 39 is provided on, for example, an inner side of the front cowl 15 or an upper section of the rear cowl 19. The occupant detecting camera 39 captures the head and the upper half body of the rider J, for example, periodically and repeatedly. The image captured by the occupant detecting camera 39 is transmitted to, for example, the control device 23, and used for driving assist control, automatic driving control, or the like, of the vehicle.

The motorcycle 1 includes the steering actuator 43, a steering damper 44 and the alarming part 49, in addition to an engine control part 45 and the brake actuator 42.

The engine control part 45 includes a fuel injection device 46, an ignition device 47, the throttle device 48, and the like. That is, the engine control part 45 includes auxiliary machinery configured to drive the engine 10. In the drawings, reference sign EN indicates a driving device including the engine 10 and auxiliary machinery.

The brake actuator 42 supplies a hydraulic pressure to the front wheel brake main body 2B and the rear wheel brake main body 7B and actuates them according to an operation to the brake operator ba. The brake actuator 42 functions as a control unit of the CBS and the ABS.

The steering actuator 43 outputs a steering torque to the steering shaft 4c. The steering actuator 43 actuates an electric motor according to the detection information of the steering torque sensor 36 and applies an assist torque to the steering shaft 4c.

The steering damper 44 is disposed in the vicinity of, for example, the head pipe 6, and applies a damping force to a steering system including the handle 20 in a steering direction (a rotation direction around the steering shaft 4c). The steering damper 44 is, for example, an electronically controlled damper with a variable damping force, and actuation thereof is controlled by the control device 23. For example, the steering damper 44 decreases a damping force applied to the steering system upon stopping or at a low vehicle speed of the motorcycle 1, and increases a damping force applied to the steering system at a middle/high vehicle speed of the motorcycle 1. The steering damper 44 may be any one of a vane type and a rod type as long as the damping force is variable depending on the control of the control device 23.

The alarming part 49 performs alarming to the rider J, for example, when it is determined that the rider J is not the prescribed ride attitude. The alarming part 49 gives the rider J a visual, auditory or tactile warning. For example, the alarming part 49 is exemplified as an indicator lamp, a display device, a speaker, an oscillator, and the like. The indicator lamp and the display device are disposed on, for example, the meter device 17. The speaker is installed in, for example, a helmet, and connected to a sound signal output part provided on the control device 23 in a wireless or wired manner. The oscillator is disposed at an area with which the body of the rider J in the prescribed ride attitude is in contact, for example, the seat 14, a knee grip (the fuel tank 13, the side cover 18, or the like), the grips 20a, the steps 14s, and the like.

<Drive Assistance Device>

Next, an example of a drive assistance device of the motorcycle 1 of the embodiment will be described.

Figure 6:
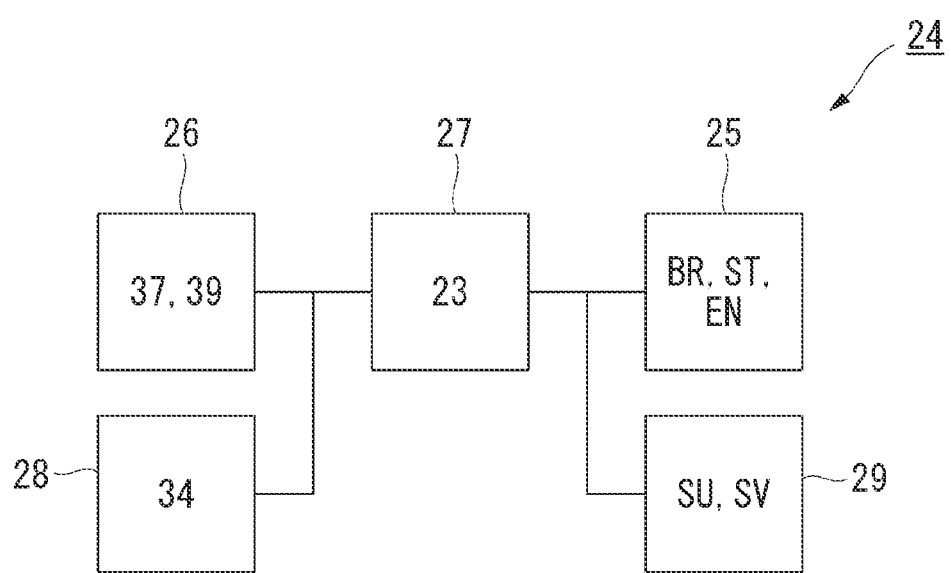
FIG. 6 is a configuration view of a drive assistance device of the motorcycle.

As shown in FIG. 6, a drive assistance device 24 of the embodiment includes: a vehicle body behavior generating part 25 configured to generate a behavior in a vehicle body by a prescribed output; a ride attitude detecting part 26 configured to detect a ride attitude of the rider J; a vehicle body behavior detecting part 28 configured to detect a roll angle from an erected state of the vehicle body; a behavior suppressing part 29 configured to suppress a behavior of at least one of the vehicle body and the rider J; and a controller 27 configured to control driving of the vehicle body behavior generating part 25 and the behavior suppressing part 29 based on detection information of the ride attitude detecting part 26 and the vehicle body behavior detecting part 28.

The vehicle body behavior generating part 25 includes, for example, the brake device BR, the steering device ST and the driving device EN.

The brake device BR includes the front and rear brake main bodies 2B and 7B and the brake actuator 42. The brake device BR is actuated by at least one of the operation of the brake operator ba and the control of the controller 27 to generate a prescribed braking force.

The steering device ST includes the steering mechanism 4S and the steering actuator 43. The steering device ST is actuated by at least one of the operation of the steering operator and the control of the controller 27 to generate a prescribed steering force.

The driving device EN includes engine auxiliary machinery such as the throttle device 48 or the like. The engine auxiliary machinery is actuated by at least one of the operation of the accelerator operator and the control of the controller 27 to generate a prescribed driving force of the engine 10.

The ride attitude detecting part 26 includes, for example, the ride sensor 37 and the occupant detecting camera 39.

The ride sensor 37 includes the grip sensors 20c, the step sensors 14c and the seat sensor 14d.

The occupant detecting camera 39 detects, for example, movements (moving amounts) of the head and the upper half body of the rider J. The occupant detecting camera 39 may detect movement of the body of the passenger on a rear part in addition to the movement of the body of the rider J.

The vehicle body behavior detecting part 28 includes, for example, the vehicle body acceleration sensor (IMU) 34. In particular, the IMU 34 detects angles (or angular speeds) and accelerations of the roll axis, the pitch axis and the yaw axis of the vehicle body including the roll angle from the erected state of the vehicle body.

The behavior suppressing part 29 includes, for example, the vehicle height adjustment device SU and the seat moving device SV. The vehicle height adjustment device SU minimizes pitching of the vehicle body by lowering a vehicle height of the motorcycle 1 when the acceleration and deceleration of automatic brake control or the like are performed.

Figure 14:
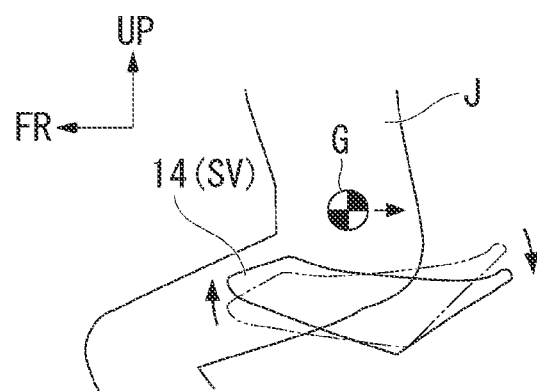
FIG. 14 is a view for explaining an action of a seat moving device of the behavior suppressing part when seen from a side.

Referring to FIG. 14, the seat moving device SV moves a center of gravity G of the rider J rearward by tilting an upper surface (a seating surface) of the seat 14 diagonally upward when automatic brake control is performed, and minimizes forward movement of the body of the rider J. The seat moving device SV may incline the seat 14 such that the outer side of the upper surface (the seating surface) of the seat 14 with respect to the corner is lifted when the automatic steering control is performed. In this case, the center of gravity G of the rider J is moved to an inner side of the corner, and the vehicle body bank state becomes easier to maintain.

The controller 27 is, for example, the control device 23. At least a part of the controller 27 may be realized by cooperation of software and hardware.

Figure 7:
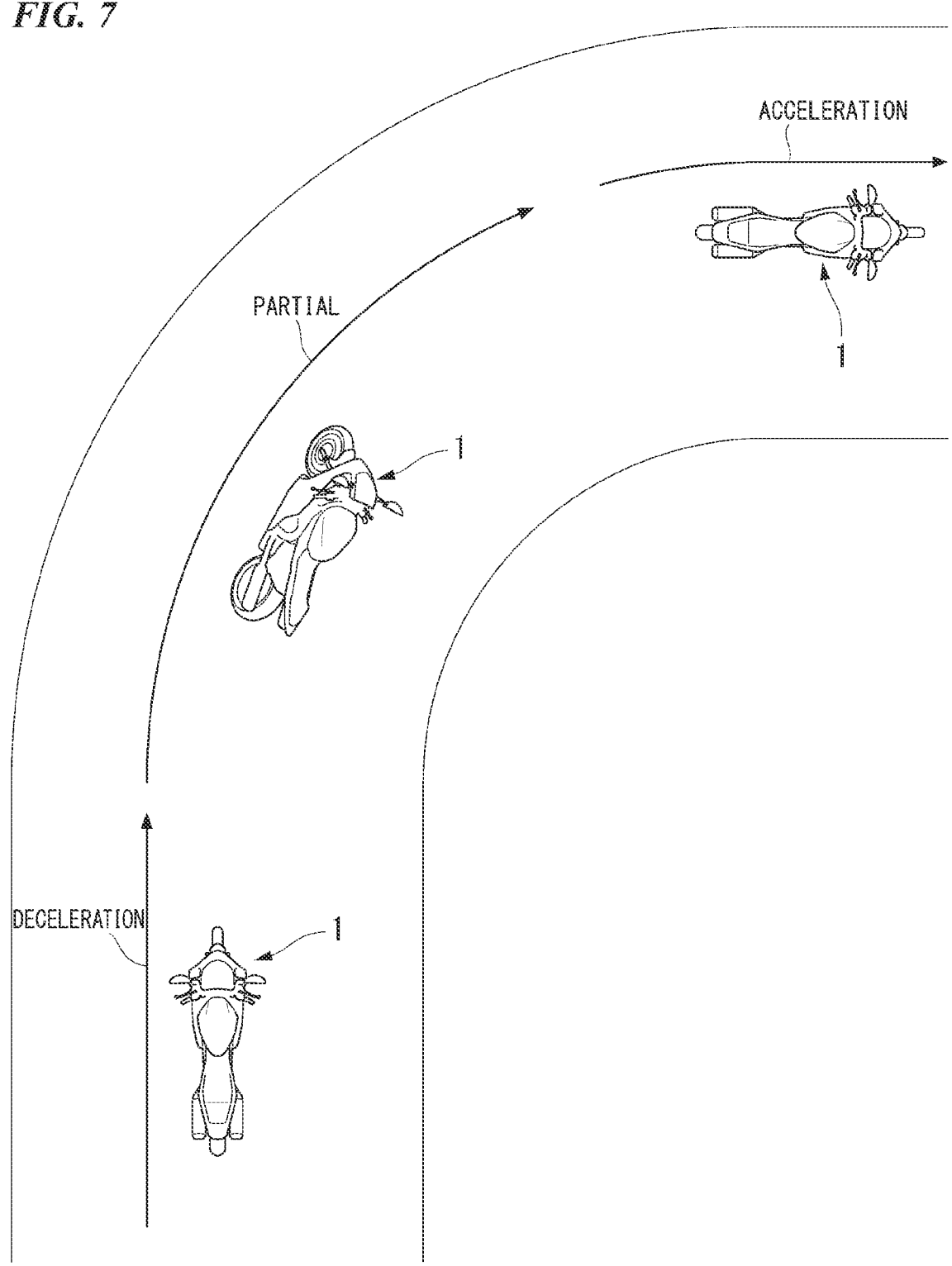
FIG. 7 is a view for explaining an example of drive assistance control of the motorcycle.
Figure 8:
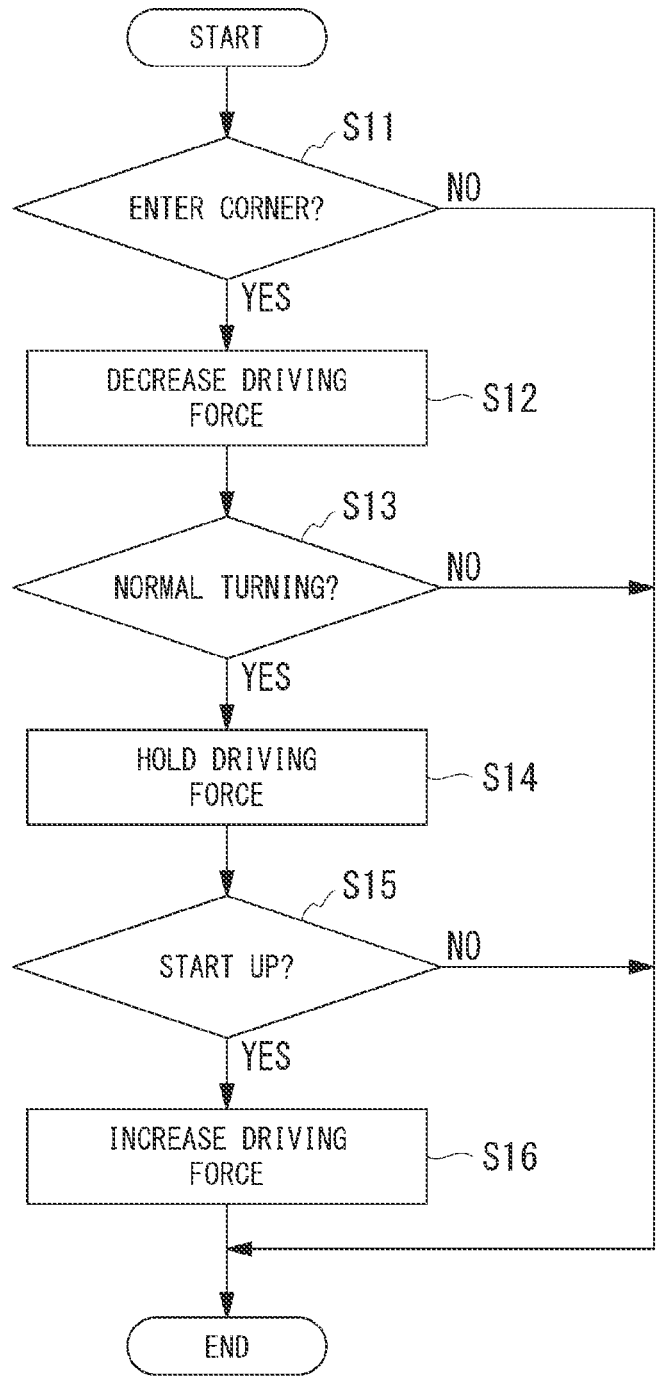
FIG. 8 is a flowchart showing an example of processing performed by the control device in the drive assistance control.

FIG. 7 is a view for explaining an example of drive assistance control, and FIG. 8 is a flowchart showing an example of processing performed by the control device 23 in the drive assistance control. Further, a control flow of the embodiment shown other than FIG. 8 is executed repeatedly at a prescribed control period (1 to 10 msec) upon turning ON of a main switch of the motorcycle 1.

The drive assistance control shown in FIGS. 7 and 8 is control when cornering is performed in the case in which only a drive assistance device such as an adaptive cruise control system (ACC), a lane keeping assistance system (LKAS), or the like, is actuated. The control device 23 recognizes a curve of the traveling lane and supports cornering based on, for example, information in front of the vehicle captured by the outside detecting camera 38.

First, the control device 23 determines whether the motorcycle 1 is upon entry of the corner (step S11). In this example, it is determined that when the motorcycle 1 begins to tilt down the vehicle body after deceleration is upon entry of the corner. At least one of deceleration and tilt-down of the vehicle body may be the case due to an operation of the rider J and the case due to automatic control. In the case of YES in step S11 (upon entry of the corner), processing is shifted to step S12. In step S12, the engine auxiliary machinery is operated by a throttle-by-wire, and a driving force by the engine 10 is decreased (for example, switched to a low output map for cornering). In the case of NO in step S11 (not entry of the corner), the processing is terminated once.

Next, the control device 23 determines whether the motorcycle 1 is in a normal turning state (step S13). The "normal turning state" is, for example, a state in which regular turning traveling is performed at a bank angle and a vehicle speed with a fixed balance, and detected by the IMU 34 and the vehicle speed sensor. In the case of YES in step S13 (a normal turning state), the processing is shifted to step S14, the driving force by the engine 10 is held constantly (a partial throttle). In the case of NO in step S13 (not a normal turning state), the processing is terminated once.

Next, the control device 23 determines whether the motorcycle 1 is at the beginning of returning to a straight line after the corner (step S15). In this example, when the outside detecting camera 38 recognizes the corner exit is determined as the start of the corner. In the case of YES in step S15 (at the start of the corner), the processing is shifted to step S16. In step S16, the engine auxiliary machinery is actuated by the throttle-by-wire, and the driving force by the engine 10 is increased (for example, returning to a state before a decrease in driving force). Accordingly, the processing is smoothly shifted to the acceleration from the start of the corner. In the case of NO in step S15, (not at the beginning of returning to a straight line after the corner), the processing is terminated once.

In the cornering of the motorcycle 1, a driving force of the engine is lowered upon entering the corner, and the driving force of the engine 10 is used to stabilize the turning movement during turning. Meanwhile, in the following travel to the preceding vehicle, when the host vehicle is turned at a fixed vehicle speed, the rider J may feel discomfort and may affect attractiveness of products.

Here, maneuverability of the rider J without discomfort is realized to improve attractiveness of products by automatically controlling the driving force of the engine 10 as described above within a range in which there is no influence on the vehicle speed.

While the drive assistance control enables the cornering of the motorcycle 1 without the operation by the rider J, it is possible to prioritize the operation intention of the rider J and to intervene the operation by the rider J during control.

Here, the motorcycle 1 generates a steering assistance force around the steering shaft 4c through driving of the steering actuator 43. Strength of the assistance force is set such that the steering operation of the rider J is not interfered.

For example, when the motorcycle 1 travels in the erected state, if a clockwise steering assistance force is generated at the center of the steering shaft 4c, the following effects occur. That is, in the motorcycle 1, an action (a roll assistance force) that attempts to roll the vehicle body to the left (a side opposite to the steering direction) occurs. In other words, an effect that causes the vehicle body to bank by the reverse handling (counter steering).

After that, the counter steering disappears along as an increase in bank angle, and further, the front wheel 2 becomes a self steering state with a steering angle toward the bank. Then, when the bank angle and the steering angle reach a predetermined angle according to the vehicle speed or the like, turning traveling that keeps the bank angle and the steering angle starts.

For example, when the motorcycle 1 is turning with the vehicle body rolled (banked) to the left, if a counterclockwise steering assistance force is generated at the center of the steering shaft 4c (on the same side as the roll direction), the following effects occur. That is, in the motorcycle 1, the action of raising the vehicle body to the right (a side opposite to the steering direction) occurs. In other words, an action of returning the vehicle body to the erected state is generated by further returning the handle of the steering mechanism 4S.

The controller 27 controls driving of the steering actuator 43 such that an increase speed (an increasing rate) of the bank angle (the roll angle) is less than a predetermined threshold when the motorcycle 1 is banked (when the bank angle is increased). The motorcycle 1 will tilt-down more slowly and it will be easier to control the vehicle body by restricting the increase speed in bank angle.

The controller 27 does not restrict the decrease speed of the bank angle when raising the motorcycle 1 from the bank state (when reducing the bank angle), and makes it easier to return vehicle body to the erected state. Accordingly, the behavior of the vehicle body is suppressed with respect to the bank state of the vehicle body, and it is possible to quickly shift to the acceleration at the end of the cornering.

Figure 10:
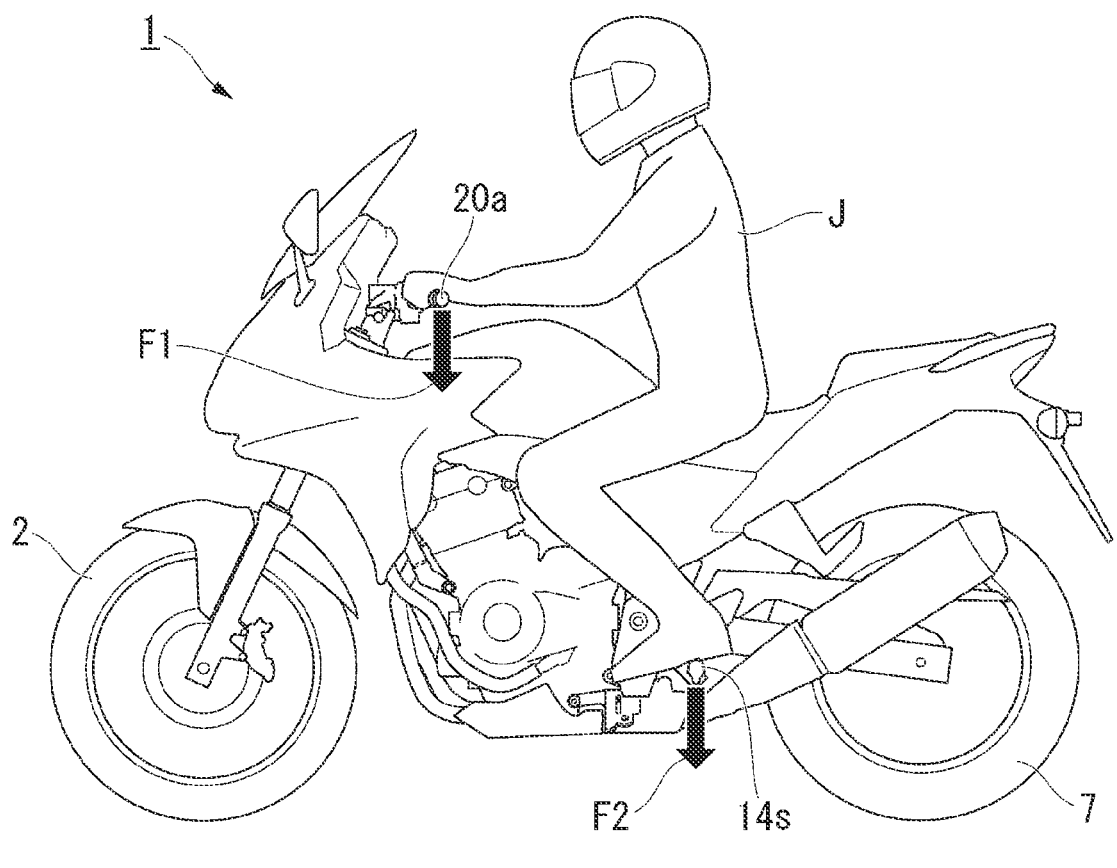
FIG. 10 is a view for explaining the motorcycle when seen from a side.

Referring to FIGS. 9 and 10, when the rider J is at a regular driving attitude, prescribed downward loads F1 and F2 are input to the left and right grips 20a and the left and right steps 14s, respectively.

On the other hand, the rider J may twist the body to look back, or stand up while holding the handle and stretch out the limbs, and the load input to the grips 20a and the steps 14s is not always symmetrical and constant. In addition, in the grips 20a and the steps 14s, the oscillation frequency also changes as the input load changes. The driving attitude of the rider J is detected using these points as well.

Figure 11:
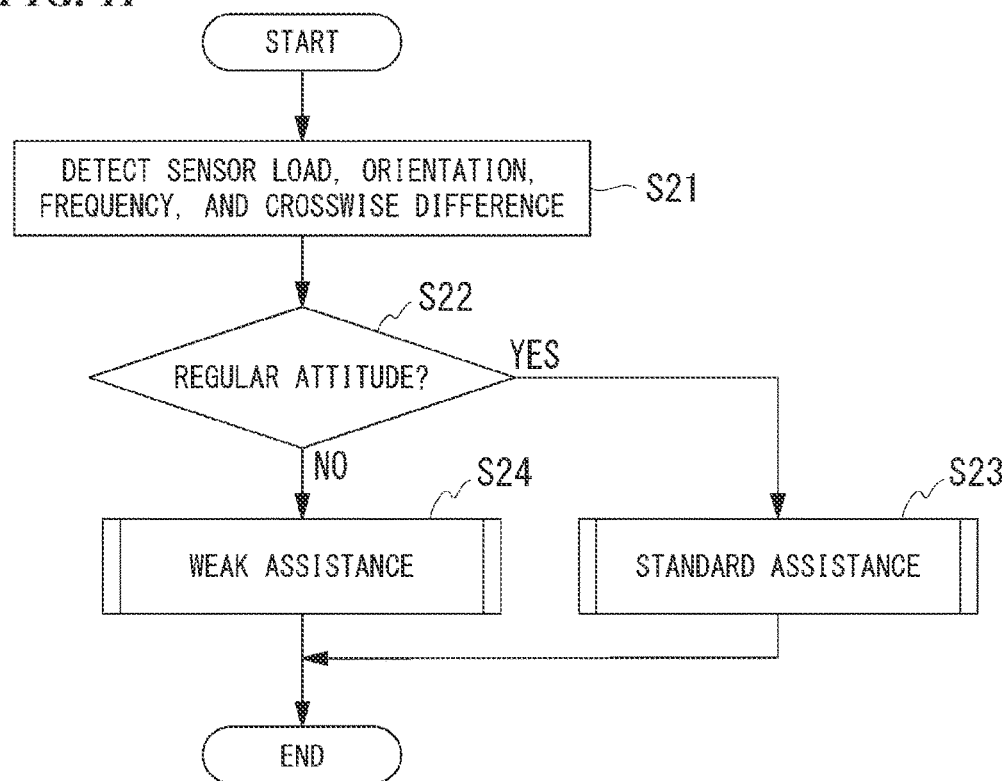
FIG. 11 is a flowchart showing an example of processing performed by the control device when an attitude of a rider on the motorcycle is detected.

FIG. 11 is a flowchart showing an example of processing performed by the control device 23 when the attitude of the rider J is detected.

In this example, the control device 23 detects a magnitude, crosswise difference, and an oscillation frequency of the load detected by the grip sensors 20c and the step sensors 14c (step S21), and determines whether the rider J is at a regular driving attitude on the basis of the detection information thereof (step S22). In the case of YES in step S22 (a regular driving attitude), the driving assistance is performed with a predetermined standard output (step S23). In the case of NO in step S22 (not a regular driving attitude), the driving assistance is performed with a low output lower than the standard output (step S24).

Figure 12:
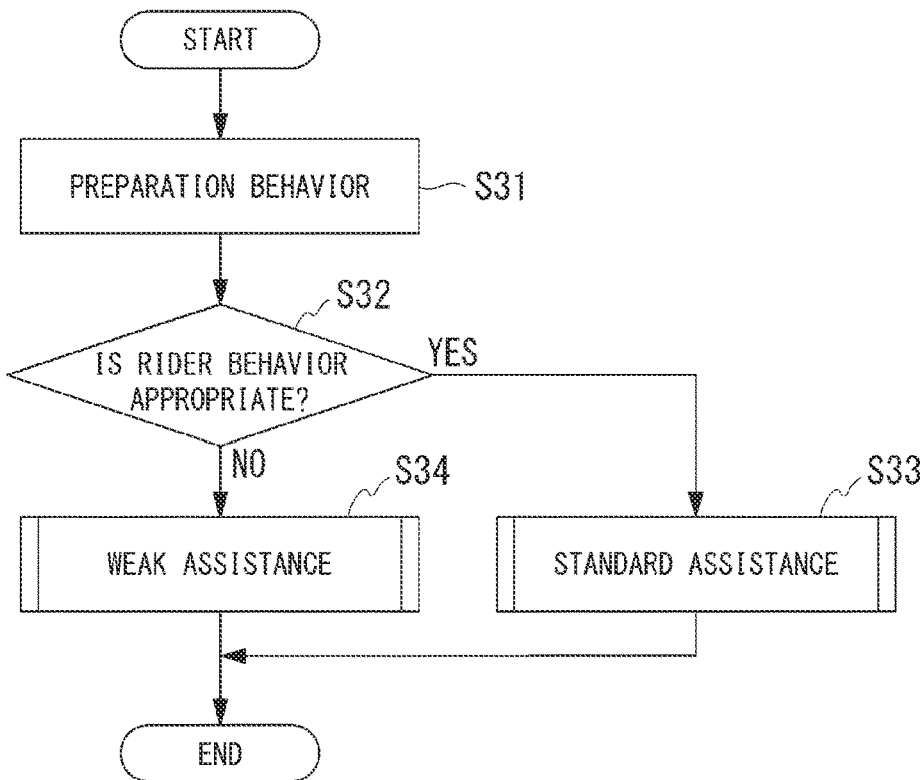
FIG. 12 is a flowchart showing an example of processing performed by the control device when a preparation behavior of the motorcycle is generated to perform driving assistance.

FIG. 12 is a flowchart showing an example of processing performed by the control device 23 when the preparation behavior is generated and the driving assistance is performed.

In this example, the control device 23 generates a preparation behavior in the vehicle body behavior generating part 25 according to a preparation output lower than the standard output (step S31). Next, it is determined whether a behavior of the rider J with respect to the preparation behavior is appropriate (whether a change of a load or the like with respect to the grips 20a and the steps 14s is within the assumption) (step S32). In the case of YES in step S32 (a behavior of the rider J is appropriate), it is determined that the rider J can withstand the vehicle body behavior that will be generated after now, and driving assistance is performed with the standard output (step S33). In the case of NO in step S32 (the behavior of the rider J is not appropriate), it is determined that the attitude of the rider J will be largely disturbed due to the vehicle body behavior that will be generated after now, and the driving assistance is performed with the low output (step S34).

Figure 13:
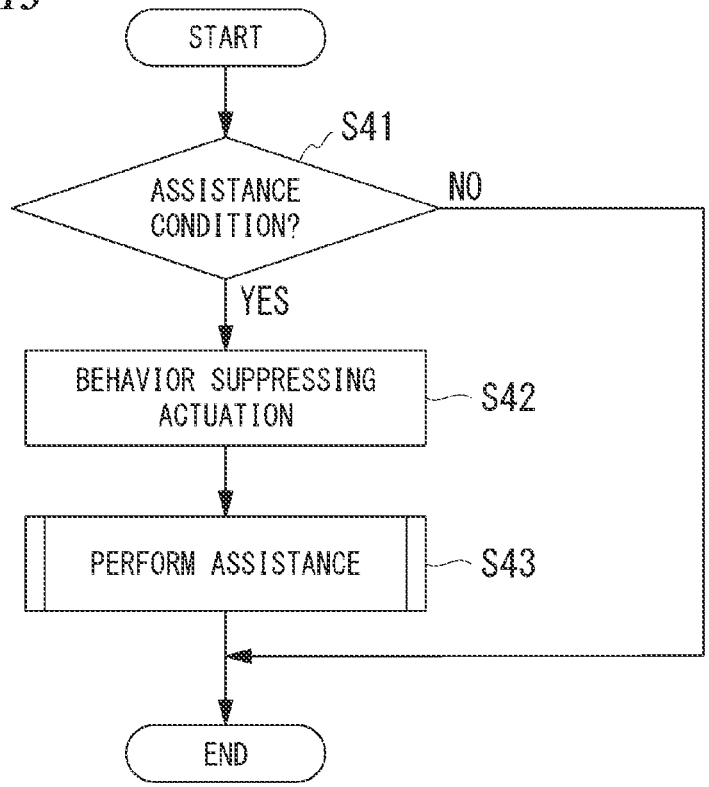
FIG. 13 is a flowchart showing an example of processing performed by the control device when a behavior suppressing part of the motorcycle is actuated to perform driving assistance.

FIG. 13 is a flowchart showing an example of processing performed by the control device 23 when the behavior suppressing part 29 is actuated and the driving assistance is performed, and FIG. 14 is a view for explaining an action of the seat moving device SV of the behavior suppressing part 29 when seen from a side.

In this example, the control device 23 determines whether the condition for the driving assistance is set (step S41). In the case of YES in step S41 (the condition for the driving assistance is set), after the behavior suppressing part 29 is actuated (step S42), the driving assistance is performed (step S43). The behavior suppressing part 29 is actuated for the purpose of at least one of suppressing the vehicle body behavior generated from now on and causing the rider J on the vehicle body to easily endure the vehicle body behavior. For the former purpose, the behavior suppressing part 29 actuates the vehicle height adjustment device SU to lower the vehicle height of the motorcycle 1. For the latter purpose, the behavior suppressing part 29 actuates the seat moving device SV to move the center of gravity G of the rider J rearward.

Here, during actuation of the automatic brake, since the rider J focuses on supporting the body attitude change due to deceleration with the arms, it becomes difficult to add the braking force by the operation of the brake lever 2a. Here, while it is conceivable to operate the brake pedal 7a with the foot to add the braking force, it is usually difficult to obtain a sufficient braking force. That is, upon deceleration of the vehicle, the rear wheel ground pressure is low, and it is difficult to increase the rear wheel braking force. Even when the interlocking front/rear brake system is provided, normally, since the rear wheel 7 is prioritized for braking upon operation of the brake pedal 7a, it is difficult to increase the braking force of the front wheel 2.

Here, in the embodiment, when the brake operation is performed by the rider J during actuation of the automatic brake, even any one of the brake operators ba is operated, the front wheel 2 is prioritized to apply braking by, for example, switching the braking force map of the front and rear wheels. Accordingly, even when the rider J tries to add a braking force by an operation of the brake pedal 7a, a sufficient braking force can be added.

A body attitude of the rider J is disturbed and it is lead to the tiredness depending on an actuation of the automatic brake control and the automatic steering control. Therefore, for example, the gravity center position of the rider J may be estimated by using the seat sensor 14d, by comparing a difference from a standard value (an estimated value) of the vehicle body behavior, and the like, and the control intervention quantity may be adjusted by the movement of the gravity center position. That is, when it is determined that movement of the gravity center position of the rider J is large, the control intervention quantity may be decreased. In addition, when the behavior (displacement) of the rider J is detected using the occupant detecting camera 39 and the behavior of the rider J is large, the control intervention quantity may be decreased.

Figure 15:
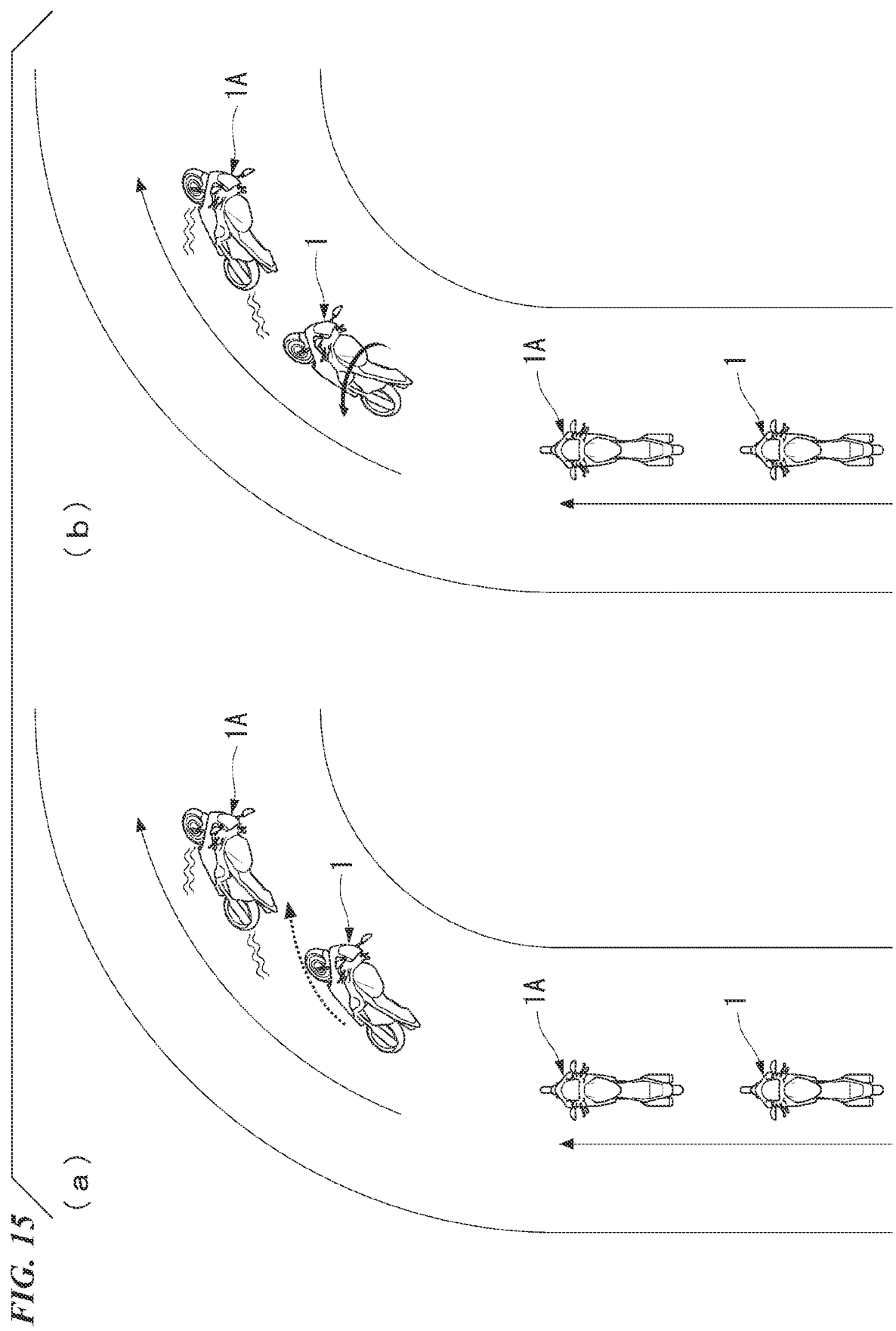
FIG. 15 is a view for explaining an application example of the drive assistance control.
Figure 16:
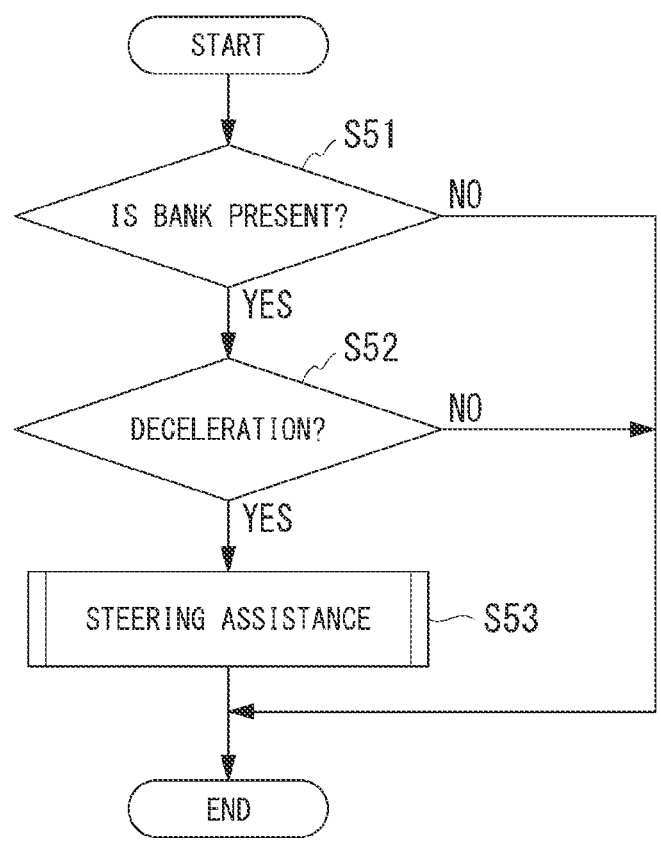
FIG. 16 is a flowchart showing an example of processing performed by a control device in the application example.

FIG. 15 is a view for explaining an application example of the drive assistance control, and FIG. 16 is a flowchart showing an example of processing performed by the control device 23 in the application example.

As shown in FIG. 15(a), in a situation in which the motorcycle 1 performs the cornering while following a preceding vehicle 1A using the adaptive cruise control system (ACC), when the preceding vehicle 1A is decelerated, the host vehicle is also decelerated according to this. Here, in a state in which the motorcycle 1 is banked, the bank angle is increased according to deceleration, and the course may move toward the inner side of the corner (indicated by a broken arrow in the drawings). In this case, normally, while the course is corrected by the operation of the rider J, the effort of the rider J is required.

That is, in the acceleration and deceleration during cornering, not only the behavior in the pitch direction occurs but also the behavior in the roll direction occurs due to adjustment of the vehicle body bank angle. For this reason, the effort of the rider J required for the vehicle body control is greater than that upon straight traveling. On the other hand, reduction in tiredness of the rider J is achieved as the control device 23 assists the acceleration and deceleration during cornering and the adjustment of the bank angle.

As shown in FIG. 15(b), in the application example, in the middle of the deceleration in which the motorcycle 1 performs cornering while following the preceding vehicle 1A, an action of raising the vehicle body (maintaining or reducing the bank angle) is generated by also actuating the steering device ST. Accordingly, non-intentional tilt-down of the motorcycle 1 is suppressed, and a change of the course of the motorcycle 1 to the inner side of the corner is suppressed according to deceleration during cornering.

As shown in FIG. 16, in the application example, first, the control device 23 determines whether the bank of the motorcycle 1 is present (step S51). In the case of YES (the bank is present) in step S51, the processing is shifted to step S52, and it is determined whether deceleration of the motorcycle 1 is present. In the case of YES (the deceleration is present) in step S52, the processing is shifted to step S53, and an action of raising the vehicle body is generated by steering assistance. In the case of NO (the bank is not present and the deceleration is not present) in steps S51 and S52, the processing is terminated once.

As described above, the drive assistance device for a saddle type vehicle in the embodiment includes the ride sensor 37 configured to detect a ride attitude of the rider J, the vehicle body behavior generating part 25 configured to generate a behavior on a vehicle body by a prescribed output, and the controller 27 configured to control driving of the vehicle body behavior generating part 25, and, when the vehicle body behavior generating part 25 is actuated regardless of the operation of the rider J, the controller 27 actuates the vehicle body behavior generating part 25 according to the ride attitude of the rider J detected by the ride sensor 37.

According to this configuration, when the automatic control condition is satisfied in which the behavior is generated in the vehicle body by the prescribed output such as automatic brake control, automatic steering control, or the like, automatic control is actuated according to the ride attitude of the rider J. Accordingly, when the rider J is at a driving attitude, which is not regular, such as one-hand driving or the like, and it is expected that the attitude of the rider J is greatly disturbed by the vehicle body behavior due to automatic control, a countermeasure of turning OFF the automatic control or decreasing the output becomes possible. Accordingly, disturbance on the attitude of the rider J can be minimized.

In addition, in the above mentioned drive assistance device for a saddle type vehicle, the vehicle body behavior generating part 25 includes the brake device BR configured to brake the host vehicle, and the controller 27 actuates the brake device BR according to the ride attitude of the rider J detected by the ride sensor 37 when the brake device BR is actuated regardless of the operation of the rider J.

According to this configuration, when the condition of the automatic brake control is satisfied, the automatic brake is turned ON/OFF or the actuation level is adjusted according to the ride attitude of the rider J. Accordingly, when the rider J is at a driving attitude that is not regular and it is expected that the attitude of the rider J is greatly disturbed by the vehicle body behavior due to automatic braking, a countermeasure of decreasing the output of the automatic brake or the like becomes possible. Accordingly, disturbance on the attitude of the rider J can be minimized.

In addition, in the above mentioned drive assistance device for a saddle type vehicle, the vehicle body behavior generating part 25 includes the steering device ST configured to steer the host vehicle, and the controller 27 actuate the steering device ST according to the ride attitude of the rider J detected by the ride sensor 37 when the steering device ST is actuated regardless of the operation of the rider J.

According to this configuration, when the condition of the automatic steering control is satisfied, the automatic steering is turned ON/OFF or the actuation level is adjusted according to the ride attitude of the rider J. Accordingly, when the rider J is at a driving attitude that is not regular and it is expected that the attitude of the rider J is greatly disturbed by the vehicle body behavior due to automatic steering, a countermeasure of decreasing the output of the automatic steering or the like becomes possible. Accordingly, disturbance on the attitude of the rider J can be minimized.

In addition, in the above mentioned drive assistance device for a saddle type vehicle, the handle 20 to which the rider J performs a steering operation is provided, the ride sensor 37 includes the grip sensors 20c that is disposed on the grips 20a of the handle 20 and that is configured to detect a gripped state by the rider J, and the controller 27 actuates the vehicle body behavior generating part 25 according to the gripped state of the rider J detected by the grip sensors 20c.

According to this configuration, the automatic control is turned ON/OFF or the actuation level is adjusted according to the gripped state of the handle grips 20a by the rider J. Accordingly, when the rider J is at a driving attitude that is not regular and it is expected that the attitude of the rider J is greatly disturbed by the vehicle body behavior due to automatic control, a countermeasure of decreasing the output of the automatic control or the like becomes possible. Accordingly, disturbance on the attitude of the rider J can be minimized.

In addition, in the above mentioned drive assistance device for a saddle type vehicle, the handle 20 includes the pair of left and right grips 20a, the ride sensor 37 includes the pair of left and right grip sensors 20c disposed on the pair of left and right grips 20a, respectively, and the controller 27 actuates the vehicle body behavior generating part 25 according to the crosswise difference of the gripped state of the rider J detected by the pair of left and right grip sensors 20c.

According to this configuration, the automatic control is turned ON/OFF or the actuation level is adjusted according to the crosswise difference of the gripped state of the left and right grips 20a by the rider J. Accordingly, when the rider J is at a driving attitude that is not regular and it is expected that the attitude of the rider J is greatly disturbed by the vehicle body behavior due to automatic control, a countermeasure of decreasing the output of the automatic control or the like becomes possible. Accordingly, disturbance on the attitude of the rider J can be minimized.

In addition, in the above mentioned drive assistance device for a saddle type vehicle, the grip sensors 20c detect a load direction with respect to the grips 20a, and the controller 27 actuates the vehicle body behavior generating part 25 according to the load direction detected by the grip sensors 20c.

According to this configuration, the automatic control is turned ON/OFF or the actuation level is adjusted according to the load direction of the grips 20a of the handle 20 by the rider J. Accordingly, when the rider J is at a driving attitude that is not regular and it is expected that the attitude of the rider J is greatly disturbed by the vehicle body behavior due to automatic control, a countermeasure of decreasing the output of the automatic control or the like becomes possible. Accordingly, disturbance on the attitude of the rider J can be minimized.

In addition, in the above mentioned drive assistance device for a saddle type vehicle, the grip sensors 20c detects an oscillation frequency of the grips 20a, and the controller 27 actuates the vehicle body behavior generating part 25 according to the oscillation frequency detected by the grip sensors 20c.

According to this configuration, the automatic control is turned ON/OFF or the actuation level is adjusted according to a change in the oscillation frequency due to existence of gripping of the grips 20a of the handle 20 by the rider J. Accordingly, when the rider J is at a driving attitude that is not regular and it is expected that the attitude of the rider J is greatly disturbed by the vehicle body behavior due to automatic control, a countermeasure of decreasing the output of the automatic control or the like becomes possible. Accordingly, disturbance on the attitude of the rider J can be minimized.

In addition, in the above mentioned drive assistance device for a saddle type vehicle, the steps 14s on which the rider J puts his/her legs are provided, the ride sensor 37 includes the step sensors 14c disposed on the steps 14s, and the controller 27 actuates the vehicle body behavior generating part 25 according to a footrest state of the rider J detected by the step sensors 14c.

According to this configuration, the automatic control is turned ON/OFF or the actuation level is adjusted according to the footrest state to the steps 14s by the rider J. Accordingly, when the rider J is at a driving attitude, which is not regular, such as removal of legs from the steps 14s, or the like, and it is expected that the attitude of the rider J is greatly disturbed by the vehicle body behavior due to automatic control, a countermeasure of decreasing the output of the automatic control or the like becomes possible. Accordingly, disturbance on the attitude of the rider J can be minimized.

In addition, in the above mentioned drive assistance device for a saddle type vehicle, the pair of left and right steps 14s are provided on both sides of the vehicle body, the ride sensor 37 includes the pair of left and right step sensors 14c disposed on the pair of left and right steps 14s, respectively, and the controller 27 actuates the vehicle body behavior generating part 25 according to the crosswise difference in the footrest state of the rider J detected by the pair of left and right step sensors 14c.

According to this configuration, the automatic control is turned ON/OFF or the actuation level is adjusted according to the crosswise difference of the footrest state to the steps 14s by the rider J. Accordingly, when the rider J is at a driving attitude that is not regular and it is expected that the attitude of the rider J is greatly disturbed by the vehicle body behavior due to automatic control, a countermeasure of decreasing the output of the automatic control or the like becomes possible. Accordingly, disturbance on the attitude of the rider J can be minimized.

In addition, in the above mentioned drive assistance device for a saddle type vehicle, the step sensors 14c detect the load direction with respect to the steps 14s, and the controller 27 actuates the vehicle body behavior generating part 25 according to the load direction detected by the step sensors 14c.

According to this configuration, the automatic control is turned ON/OFF and the actuation level is adjusted according to the load direction with respect to the steps 14s by the rider J. Accordingly, when the rider J is at a driving attitude that is not regular and it is expected that the attitude of the rider J is greatly disturbed by the vehicle body behavior due to automatic control, a countermeasure of decreasing the output of the automatic control or the like becomes possible. Accordingly, disturbance on the attitude of the rider J can be minimized.

In addition, in the above mentioned drive assistance device for a saddle type vehicle, the step sensors 14c detects an oscillation frequency of the steps 14s, and the controller 27 actuates the vehicle body behavior generating part 25 according to the oscillation frequency detected by the step sensors 14c.

According to this configuration, the automatic control is turned ON/OFF or the actuation level is adjusted according to a change in the oscillation frequency due to existence of the footrest load with respect to the steps 14s by the rider J. Accordingly, when the rider J is at a driving attitude that is not regular and it is expected that the attitude of the rider J is greatly disturbed by the vehicle body behavior due to automatic control, a countermeasure of decreasing the output of the automatic control or the like becomes possible. Accordingly, disturbance on the attitude of the rider J can be minimized.

In addition, in the above mentioned drive assistance device for a saddle type vehicle, first, the controller 27 controls the vehicle body behavior generating part 25 so as to generate a low output that is lower than a predetermined original target output when the vehicle body behavior generating part 25 is actuated regardless of the operation of the rider J, and sets the output value after that according to the change of at least one of the gripped state of the grips and the footrest state of the steps generated due to the low output.

According to this configuration, when the condition of the automatic control is satisfied, in which the behavior is generated in the vehicle body by the prescribed output, such as automatic brake control, automatic steering control, or the like, an automatic control level (strength) is set according to the change of at least one of the gripped state of the grips and the footrest state of the steps by the rider J. Accordingly, when the rider J is at a driving attitude, which is not regular, such as one-hand driving, removal of the legs from the steps, or the like, and it is expected that attitude of the rider J is greatly disturbed by the vehicle body behavior due to automatic control, a countermeasure of decreasing the output of the automatic control or the like becomes possible. Accordingly, disturbance on the attitude of the rider J can be minimized.

In addition, in the above mentioned drive assistance device for a saddle type vehicle, the behavior suppressing part 29 configured to suppress the behavior of at least one of the vehicle body and the rider J according to actuation of the brake device BR is provided, and the controller 27 actuates the brake device BR in a state in which the behavior suppressing part 29 is actuated.

According to this configuration, when the condition of the automatic brake control is satisfied, the behavior of at least one of the vehicle body and the rider J is suppressed by the behavior suppressing part 29 by actuating the automatic brake while the behavior suppressing part 29 is actuated, and disturbance on the attitude of the rider J can be minimized.

In addition, in the above mentioned drive assistance device for a saddle type vehicle, the behavior suppressing part 29 includes the vehicle height adjustment device SU configured to increase and decrease the vehicle height of the motorcycle 1, and the controller 27 actuates the brake device BR in a state in which the vehicle height adjustment device SU is actuated and the vehicle height is lowered.

According to this configuration, when the condition of the automatic brake control is satisfied, the behavior (pitching) of the vehicle body by the behavior suppressing part 29 is suppressed by actuating the automatic brake while the vehicle height of the motorcycle 1 is lowered, and disturbance on the attitude of the rider J can be minimized.

In addition, in the above mentioned drive assistance device for a saddle type vehicle, the behavior suppressing part 29 includes the seat moving device SV configured to change a relative height of front and rear sides of the seat 14 on which the occupant sits, and the controller 27 actuates the brake device BR in a state in which the seat moving device SV is actuated and the seat 14 is inclined rearward and downward.

According to this configuration, when the condition of the automatic brake control is satisfied, a behavior (forward movement) of the body of the rider J is suppressed by the behavior suppressing part 29 by actuating the automatic brake while the seat 14 is inclined rearward, and disturbance on the attitude of the rider J can be minimized.

In addition, in the above mentioned drive assistance device for a saddle type vehicle, the brake operator ba that allows the rider J to operate the brake device BR is provided, and, in the case in which the operation with respect to the brake operator ba is performed when the brake device BR is actuated, the controller 27 increases the output of the brake device BR according to such operation.

According to this configuration, in the case in which the brake operator ba is operated such that the rider J intends to increase the braking force when the automatic brake is actuated, the braking force can be increased according to the intention of the rider J to apply more brakes by increasing the output of the brake device according to the operation.

Further, the present invention is not limited to the above-mentioned embodiment, and for example, a configuration of detecting a ride attitude of a rider in relation with a sensor installed on a helmet, clothes, or the like, of the rider may be provided.

All vehicles on which a driver rides on the vehicle body are included as the saddle type vehicle, and in addition to a motorcycle (including a motorized bicycle and a scootertype vehicle), a three-wheeled vehicle (including a two-front-wheeled and one-rear-wheeled vehicle in addition to one-front-wheeled and two-rear-wheeled vehicle) or a four-wheeled vehicle may also be included.

Then, the configuration according to the embodiment is an example of the present invention, and various changes may be made without departing from the scope of the present invention, such as substitution of the components of the embodiment with known components, and the like.

REFERENCE SIGNS LIST

1 Motorcycle (saddle type vehicle)
1A Preceding vehicle
2a Brake lever
3 Front forks
4S Steering mechanism
7a Brake pedal
8a Rear cushion
10 Engine
14 Seat
14c Step sensor
14d Seat sensor
14s Step
20 Handle
20a Grip
20c Grip sensor
24 Drive assistance device
25 Vehicle body behavior generating part
26 Occupant attitude detecting part
27 Controller
28 Vehicle body behavior detecting part
29 Behavior suppressing part
37 Ride sensor
39 Occupant detecting camera
43 Steering actuator
BR Brake device
EN Driving device
ST Steering device
SU Vehicle height adjustment device
SV Seat moving device
ba Brake operator
J Rider

The invention claimed is:

1. A drive assistance device for a saddle type vehicle comprising:
a ride sensor configured to detect a ride attitude of a rider;
a vehicle body behavior generating part configured to generate a behavior on a vehicle body by a prescribed output; and
a controller configured to control driving of the vehicle body behavior generating part,
wherein the vehicle body behavior generating part comprises a steering device configured to steer a host vehicle, wherein the steering device comprises a grip sensor representing a piezoelectric sensor that determines an orientation of a gripping load applied to the grip sensor by the rider and determines that the gripping load that is being applied by the user to the grip sensor exceeds a threshold value, and
wherein, when the steering device is actuated regardless of an operation of the rider, the controller actuates the steering device according to the ride attitude of the rider detected by the ride sensor.

2. The drive assistance device for a saddle type vehicle according to claim 1, comprising: a handle to which the rider performs a steering operation,
wherein the grip sensor is disposed on a grip of the handle and detects a gripped state of the rider, and
the controller actuates the vehicle body behavior generating part according to the gripped state of the rider detected by the grip sensor.

3. The drive assistance device for a saddle type vehicle according to claim 2, wherein the handle comprises a pair of left and right grips,
the ride sensor comprises a pair of left and right grip sensors disposed on the pair of left and right grips, respectively, and
the controller actuates the vehicle body behavior generating part according to a crosswise difference of the gripped state of the rider detected by the pair of left and right grip sensors.

4. The drive assistance device for a saddle type vehicle according to claim 3, wherein the grip sensor detects a load direction with respect to the grip, and
the controller actuates the vehicle body behavior generating part according to the load direction detected by the grip sensor.

5. The drive assistance device for a saddle type vehicle according to claim 2, wherein the grip sensor detects an oscillation frequency of the grip, and
the controller actuates the vehicle body behavior generating part according to the oscillation frequency detected by the grip sensor.

6. The drive assistance device for a saddle type vehicle according to claim 1, comprising: a step on which the rider puts his/her foot,
wherein the ride sensor comprises a step sensor disposed on the step, and
wherein the controller actuates the vehicle body behavior generating part according to a footrest state of the rider detected by the step sensor.

7. The drive assistance device for a saddle type vehicle according to claim 6, comprising: a pair of left and right steps on both sides of a vehicle body,
wherein the ride sensor comprises a pair of left and right step sensors disposed on the pair of left and right steps, respectively, and
wherein the controller actuates the vehicle body behavior generating part according to a crosswise difference between the footrest states of the rider detected by the pair of left and right step sensors.

8. The drive assistance device for a saddle type vehicle according to claim 6, wherein the step sensor detects a load direction with respect to the step, and
the controller actuates the vehicle body behavior generating part according to the load direction detected by the step sensor.

9. The drive assistance device for a saddle type vehicle according to claim 6, wherein the step sensor detects an oscillation frequency of the step, and
wherein the controller actuates the vehicle body behavior generating part according to the oscillation frequency detected by the step sensor.

* * * * *